(12) United States Patent
Hu et al.

(10) Patent No.: US 12,010,743 B2
(45) Date of Patent: Jun. 11, 2024

(54) USER EQUIPMENT DISCOVERY

(71) Applicant: Telefonaktiebolaget LM Ericsson (publ), Stockholm (SE)

(72) Inventors: Liang Hu, San Diego, CA (US); Marco Belleschi, Solna (SE); Zhang Zhang, Beijing (CN); Jingya Li, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 549 days.

(21) Appl. No.: 17/266,746

(22) PCT Filed: Aug. 12, 2019

(86) PCT No.: PCT/SE2019/050737
§ 371 (c)(1),
(2) Date: Feb. 8, 2021

(87) PCT Pub. No.: WO2020/032869
PCT Pub. Date: Feb. 13, 2020

(65) Prior Publication Data
US 2021/0315032 A1    Oct. 7, 2021

(30) Foreign Application Priority Data
Aug. 10, 2018 (WO) ................ PCT/CN2018/099950

(51) Int. Cl.
*H04W 76/14* (2018.01)
*H04L 67/51* (2022.01)
(Continued)

(52) U.S. Cl.
CPC ............. *H04W 76/14* (2018.02); *H04W 4/23* (2018.02); *H04W 8/005* (2013.01); *H04W 8/24* (2013.01); *H04W 72/20* (2023.01)

(58) Field of Classification Search
CPC ..... H04W 76/14; H04W 72/20; H04W 8/005; H04W 8/20; H04W 8/24; H04W 84/18;
(Continued)

(56) References Cited

U.S. PATENT DOCUMENTS 6,968,190 B1 * 11/2005 Suumaki ........... H04W 36/0066
455/439
9,179,376 B2 * 11/2015 Wang ................ H04W 36/0077
(Continued)

OTHER PUBLICATIONS

"3rd Generation Partnership Project; Technical Specification Group Services and System Aspects; Proximity-based services (ProSe); Stage 2 (Release 12)", 3GPP TS 23.303 V 12.8.0, Mar. 2016, 58 pages.
3GPP, "3GPP TS 23.285 V14.3.0", 3rd Generation Partnership Project; Technical Specification Group Services and System Aspects; Architecture enhancements for V2X services (Release 14), Jun. 2017, 1-35.
(Continued)

*Primary Examiner* — Jenee Holland
(74) *Attorney, Agent, or Firm* — Weisberg I.P. Law, P.A.

(57) ABSTRACT

A user equipment, UE, receives radio resource control, RRC, signaling from a peer UE (14). The RRC signaling indicates radio layer parameters supported by the peer UE (14) or indicates whether radio layer parameters supported by the peer UE (14) are compatible with radio layer parameters required for a connection between the peer UE (14) and the UE. The UE determines whether or not to establish a connection towards the peer UE (14) based on the received RRC signaling.

12 Claims, 17 Drawing Sheets

(51) Int. Cl.
*H04W 4/23* (2018.01)
*H04W 8/00* (2009.01)
*H04W 8/24* (2009.01)
*H04W 72/20* (2023.01)
*H04W 92/18* (2009.01)

(58) Field of Classification Search
CPC ..... H04W 88/04; H04W 40/24; H04W 48/16; H04L 41/5058; H04L 67/75
See application file for complete search history.

(56) References Cited

U.S. PATENT DOCUMENTS

| | | | | |
|---|---|---|---|---|
| 9,838,923 | B1* | 12/2017 | Sitton | H04W 76/19 |
| 2013/0231120 | A1* | 9/2013 | Koc | H04W 76/34 |
| | | | | 455/450 |
| 2014/0140305 | A1* | 5/2014 | Barrett | H04W 4/70 |
| | | | | 370/329 |
| 2014/0219088 | A1* | 8/2014 | Oyman | H04N 21/23439 |
| | | | | 370/231 |
| 2015/0373753 | A1* | 12/2015 | Turon | H04W 12/009 |
| | | | | 370/254 |
| 2016/0286471 | A1* | 9/2016 | Zisimopoulos | H04W 8/005 |
| 2016/0360563 | A1* | 12/2016 | Lecroart | H04L 69/322 |
| 2017/0055313 | A1* | 2/2017 | Sharma | H04W 36/0066 |
| 2017/0251109 | A1* | 8/2017 | Garcia Martin | H04L 12/1407 |
| 2018/0020442 | A1* | 1/2018 | Nair | H04W 72/20 |
| 2018/0084481 | A1* | 3/2018 | Wang | H04W 40/246 |
| 2018/0103504 | A1* | 4/2018 | Quan | H04W 52/02 |
| 2018/0115554 | A1* | 4/2018 | Dyon | H04L 63/164 |
| 2018/0184348 | A1* | 6/2018 | Uemura | H04W 48/20 |
| 2018/0227332 | A1* | 8/2018 | Neystadt | H04L 65/1053 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, 1-106.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.2.0, Mar. 2017, 1-7.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, pp. 1-654.

3GPP, "3rd Generation Partnership Project; Technical Specification Group Services and System Aspects; Service requirements for V2X services; Stage 1 (Release 14)", 3GPP TS 22.185 V14.2.1, Nov. 2016, 1-14.

Ericsson, "On the sidelink QoS flow and radio bearer", 3GPP TSG-RAN WG2 #106, R2-1907364, Reno, USA, May 13-17, 2019, 1-5.

Huawei, et al., "New WID on 3GPP V2X Phase 2", 3GPP TSG RAN Meeting #75, RP-170798, (revision of RP-170724), Dubrovnik, Croatia, Mar. 6-9, 2017, 1-5.

OPPO, "Summary of [104#55][NR/V2X] Unicast (OPPO)", 3GPP TSG-RAN WG2 Meeting #105, R2-1900180, Athens, Greece, Feb. 25-Mar. 1, 2019, 1-28.

Qualcomm Incorporated, "Coexistence between Rel-14 and Rel-15 V2X UEs", 3GPP TSG RAN WG2 Meeting #100, R2-1713407, Reno, USA, Nov. 27-Dec. 1, 2017, 1-3.

* cited by examiner

USER EQUIPMENT DISCOVERY

TECHNICAL FIELD

The present application relates generally to wireless communications and relates more particularly to peer user equipment discovery for device to device (D2D) communications.

BACKGROUND

Device to device (D2D) communications enable two or more nearby user equipment (UEs) to communicate directly. A UE may for example discover another UE in its proximity and then initiate a connection with that UE, so that communications between them need not traverse any network node. D2D communications such as this may enable new types of services for vehicle-to-anything (V2X) communication, such as platooning and cooperative sensor sharing. These and other services, however, may demand quality of services (QoS) requirements that, under certain conditions, some UEs may not be capable of meeting. Existing approaches to UE discovery fail to account for this and thereby threaten to introduce inefficient connection establishment with UEs that are incapable of meeting QoS demands.

SUMMARY

According to some embodiments herein, a user equipment (UE) engages in radio resource control (RRC) signaling with a peer UE, in order to determine whether radio layer parameters supported by the peer UE are compatible with radio layer parameters required for a connection between the UEs. Such RRC signaling exchange enables the UE to selectively establish a connection between the UEs, e.g., so as to avoid needlessly and inefficiently establishing the connection if the peer UE's supported radio layer parameters are incompatible with the connection's radio layer parameter requirements. Some embodiments may thereby advantageously conserve processing and radio resources that would otherwise be wasted due to incompatible radio layer parameters.

More particularly, embodiments herein include a method performed by a UE. The method comprises receiving RRC signaling from a peer UE. In some embodiments, the RRC signaling indicates radio layer parameters supported by the peer UE or indicates whether radio layer parameters supported by the peer UE are compatible with radio layer parameters required for a connection between the peer UE and the UE. The method may further include determining whether or not to establish a connection towards the peer UE based on the received RRC signaling.

In some embodiments, the received RRC signaling indicates radio layer parameters supported by the peer UE. In this case, the determination of whether or not to establish the connection may comprise evaluating, based on the received RRC signaling, whether radio layer parameters supported by the peer UE are compatible with radio layer parameters required for a connection between the peer UE and the UE. The determination may then comprise determining whether or not to establish a connection towards the peer UE, based respectively on whether or not, according to said evaluating, radio layer parameters supported by the peer UE are compatible with radio layer parameters required for a connection between the peer UE and the UE.

In other embodiments, by contrast, the RRC signaling indicates whether radio layer parameters supported by the peer UE are compatible with radio layer parameters required for a connection between the peer UE and the UE. In one embodiment, for instance, the determination of whether or not to establish the connection comprises determining whether or not to establish a connection towards the peer UE, based respectively on whether or not, according to the RRC signaling, radio layer parameters supported by the peer UE are compatible with radio layer parameters required for a connection between the peer UE and the UE. In some of these embodiments, the method may also comprise, before receiving the RRC signaling, transmitting to the peer UE RRC signaling that indicates radio layer parameters supported by the UE.

Regardless, the method in some embodiments may also comprise establishing or not establishing a connection towards the peer UE depending on said determining.

In some embodiments, the method further comprises, receiving, at an RRC layer of the UE, information from an upper layer of the UE that indicates one or more peer UEs as candidates for connection establishment. The upper layer is higher than the RRC layer. In this case, the one or more peer UEs includes said peer UE. The method may also comprise, responsive to receiving the information at the RRC layer, triggering an RRC layer information exchange with each of the one or more peer UEs in which the UE receives from each peer UE RRC signaling that indicates radio layer parameters supported by the peer UE or indicates whether radio layer parameters supported by the peer UE are compatible with radio layer parameters required for a connection between the peer UE and the UE. The method may further comprise determining, at the RRC layer of the UE and based on the RRC layer information exchange with each of the one or more peer UEs, whether radio layer parameters supported by the peer UE are compatible with radio layer parameters required for a connection between the peer UE and the UE. The method may moreover comprise transmitting, from the RRC layer to the upper layer, information indicating at least one of the one or more peer UEs that supports radio layer parameters which are compatible with radio layer parameters required for a connection between the peer UE and the UE. The upper layer may then determine whether or not to establish a connection towards the peer UE based on the information transmitted from the RRC layer to the upper layer.

Alternatively or additionally, the method may further comprise receiving, at an upper layer of the UE that is higher than an RRC layer of the UE, one or more advertisement messages from one or more advertising UEs. In this case, the one or more advertising UEs include the peer UE. The method may also comprise determining, based on the one or more advertisement messages, which of the one or more advertising UEs are candidates for connection establishment. The peer UE may be determined to be a candidate for connection establishment.

In some embodiments, an advertisement message from an advertising UE indicates one or more of: a speed of the advertising UE; a location of the advertising UE; a type of the advertising UE; a proximity of the advertising UE to the UE; or a service of interest to the advertising UE.

Alternatively or additionally, an advertisement message from an advertising UE includes an intension code. The intension code may indicate one or more of: a direction, relative to the advertising UE, in which the advertising UE intends to discover a UE to which to connect; or a distance or radius from the advertising UE within which the advertising UE intends to discover a UE to which to connect. In this case, then, determining which of the one or more advertising UEs are candidates for connection establishment may comprise determining whether an advertising UE is or is not a candidate for connection establishment based respectively on whether the UE is or is not: (i) in the direction in which the advertising UE intends to discover a UE to which to connect, as indicated by the intention code included in an advertisement message received from that advertising UE; and/or (ii) within the distance or radius from the advertising UE within which the advertising UE intends to discover a UE to which to connect, as indicated by the intention code included in an advertisement message received from that advertising UE.

In any of these embodiments, the connection may be an application layer connection, a Proximity Services, Pro Se, connection, or a Vehicle-To-Everything, V2X, connection.

Also in any of these embodiments, radio layer parameters may include one or more of: Multiple Input Multiple Output, M IMO, parameters supported by the peer UE; a 3GPP standardization release version supported by the peer UE; one or more modulation and coding schemes, MCSs, supported by the peer UE; one or more transport block sizes, TBSs, supported by the peer UE; a processing latency capability supported by the peer UE; a quality of service level supported by the peer UE; a level of channel interference or congestion; one or more carrier frequencies supported by the peer UE; or one or more carrier aggregation, CA, band combinations supported by the peer UE.

Embodiments herein also include a method performed by a peer UE. The method comprises transmitting RRC signaling to a UE. In some embodiments, the RRC signaling indicates radio layer parameters supported by the peer UE or indicates whether radio layer parameters supported by the peer UE are compatible with radio layer parameters required for a connection between the peer UE and the UE. The method may further include, responsive to transmitting the signaling and when radio layer parameters supported by the peer UE are compatible with radio layer parameters required for a connection between the peer UE and the UE, establishing a connection with the UE.

In some embodiments, the method further comprises receiving, from the UE, RRC signaling that requests the radio layer parameters supported by the peer UE. In this case, the RRC signaling transmitted to the UE indicates the requested radio layer parameters supported by the peer UE.

In other embodiments, the method further comprises receiving, from the UE, RRC signaling that indicates the radio layer parameters required for a connection between the peer UE and the UE. In this case, the RRC signaling transmitted to the UE indicates whether radio layer parameters supported by the peer UE are compatible with radio layer parameters required for a connection between the peer UE and the UE.

In some embodiments, the method further comprises at an upper layer of the peer UE that is higher than an RRC layer of the peer UE, transmitting an advertisement message to the UE. In some embodiments, an advertisement message from an advertising UE indicates one or more of: a speed of the advertising UE; a location of the advertising UE; a type of the advertising UE; a proximity of the advertising UE to the UE; or a service of interest to the advertising UE. Alternatively or additionally, an advertisement message from an advertising UE includes an intension code. The intension code may indicate one or more of: a direction, relative to the advertising UE, in which the advertising UE intends to discover a UE to which to connect; or a distance or radius from the advertising UE within which the advertising UE intends to discover a UE to which to connect.

In any of these embodiments, the connection may be an application layer connection, a Proximity Services, Pro Se, connection, or a Vehicle-To-Everything, V2X, connection.

Also in any of these embodiments, radio layer parameters may include one or more of: Multiple Input Multiple Output, M IMO, parameters supported by the peer UE; a 3GPP standardization release version supported by the peer UE; one or more modulation and coding schemes, MCSs, supported by the peer UE; one or more transport block sizes, TBSs, supported by the peer UE; a processing latency capability supported by the peer UE; a quality of service level supported by the peer UE; a level of channel interference or congestion; one or more carrier frequencies supported by the peer UE; or one or more carrier aggregation, CA, band combinations supported by the peer UE.

Embodiments herein further include corresponding apparatus, computer programs, and carriers. For example, embodiments herein include a UE configured (e.g., via communication circuitry and processing circuitry) to receive RRC signaling from a peer UE. In some embodiments, the RRC signaling indicates radio layer parameters supported by the peer UE or indicates whether radio layer parameters supported by the peer UE are compatible with radio layer parameters required for a connection between the peer UE and the UE. The UE may be further configured to determine whether or not to establish a connection towards the peer UE based on the received RRC signaling.

Embodiments also include a peer UE configured (e.g., via communication circuitry and processing circuitry) to transmit RRC signaling to a UE. In some embodiments, the RRC signaling indicates radio layer parameters supported by the peer UE or indicates whether radio layer parameters supported by the peer UE are compatible with radio layer parameters required for a connection between the peer UE and the UE. The peer UE may be further configured to establish or not establish a connection with the UE, depending on whether or not radio layer parameters supported by the peer UE are compatible with radio layer parameters required for a connection between the peer UE and the UE.

DETAILED DESCRIPTION

Figure 1:
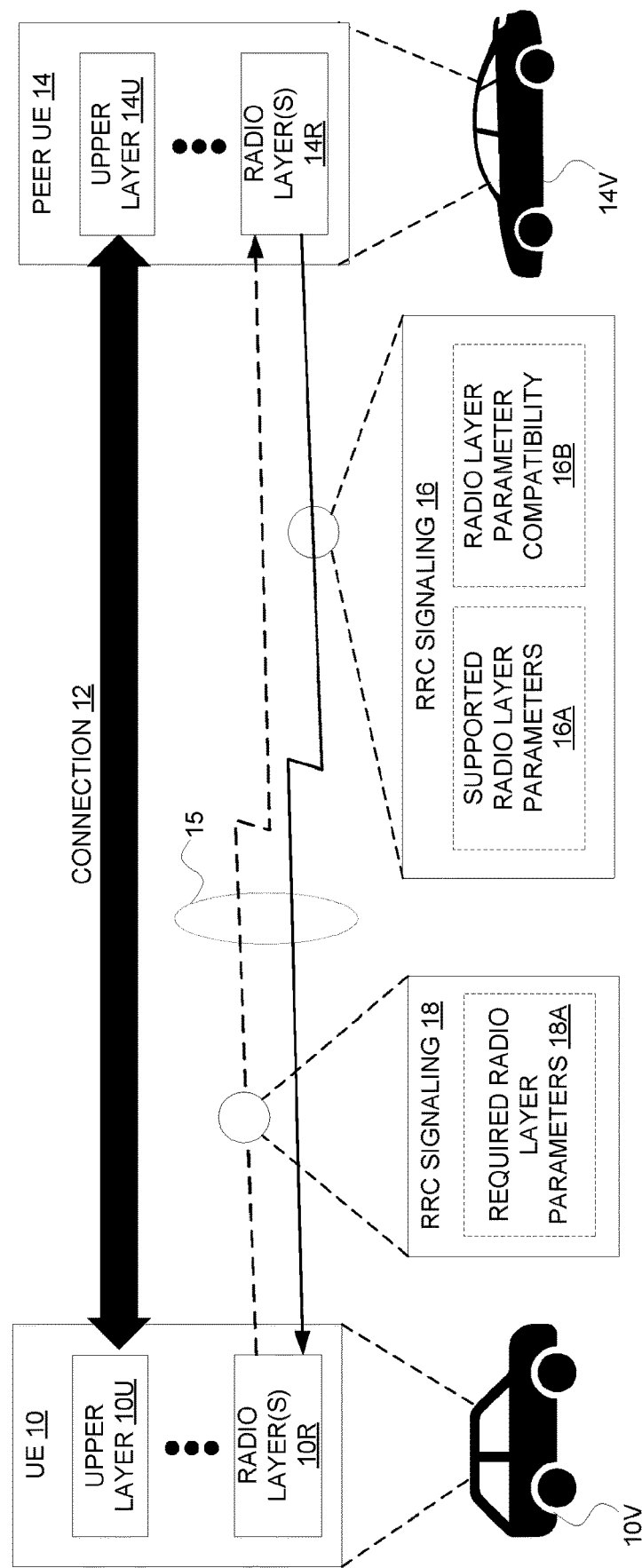
FIG. 1 is a block diagram of a user equipment and a peer user equipment engaging in a signaling exchange for determining whether to perform connection establishment according to some embodiments.

FIG. 1 shows a user equipment (UE) 10 according to some embodiments. As shown, the UE 10 may be a part of a vehicle 10V, e.g., may be integrally or removably incorporated into the vehicle 10V. Or, the UE 10 may be placed in the vehicle 10V. For example, the UE 10 may be carried by, held by, or otherwise associated with a driver or passenger of the vehicle 10V. In other embodiments, not shown, though, the UE 10 may be carried by or otherwise associated with any individual, e.g., a pedestrian, cyclist, driver, or passenger. Or, the UE 10 may be a part of roadside network infrastructure, e.g., a roadside unit (RSU) which is a transportation infrastructure entity that communicates with vehicle-to-everything (V2X) capable UEs.

In some embodiments, the UE 10 is capable of establishing a connection 12 with a peer UE 14, so that the UEs 10, 14 can communicate directly without any intervening network node. The connection 12 may be a device-to-device (D2D) connection or a Proximity Services (Pro Se) connection. The connection 12 may alternatively or additionally be a vehicle-to-vehicle (V2V) or V2X connection in some embodiments. For example, the peer UE 12 may similarly be a part of a vehicle 12V or roadside network infrastructure, or may be carrier by or associated with an individual. In these and other embodiments, then, the connection 12 as shown may be established at an application layer or other upper layer 10U, 14U of respective protocol stacks supported by the UEs 10, 14.

The connection 12 may nonetheless be supported by or otherwise be dependent upon one or more radio layers 10R, 14R of the UE's respective protocol stacks, e.g., in the sense that data for the connection 12 may be transported over or via the one or more radio layers 10R, 14R. Such radio layer(s) 10R, 14R may include for instance a physical (PHY) layer, a medium access control (MAC) layer, and/or a radio resource control (RRC) layer. These radio layer(s) 10R, 14R may be governed by or otherwise impacted by one or more radio layer parameters. The one or more radio layer parameters in this regard may for example include a modulation and coding scheme, a transport block size, a processing latency, one or more carrier frequencies, one or more carrier aggregation band combination(s), a 3GPP standardization release version, one or more Multiple Input Multiple Output (M IMO) parameters, a level of channel interference or congestion, or a quality of service (QoS) level.

Notably, according to some embodiments, the UE 10 engages in signaling (e.g., RRC signaling) with the peer UE 14, e.g., as part of a so-called radio layer information exchange 15, in order to determine whether radio layer parameters supported by the peer UE 14 are compatible with radio layer parameters required for the connection 12 between the UEs 10, 14. For example, the signaling may enable a determination as to whether the modulation and coding scheme or transport block size supported by the peer UE 14 is compatible with the modulation and coding scheme or transport block size required for the connection 12. Which radio layer parameters are required for the connection 12 may for instance be determined by the UE 10, e.g., as being those parameters required in order for the connection 12 to meet certain requirements on a quality of service or other quality metric. In any event, such signaling exchange may be performed as part of or after discovery procedures via which the UEs 10, 14 discover one another's presence. In these and other cases, then, the signaling exchange may enable the UE 10 to selectively establish the connection 12 between the UEs 10, 14, e.g., so as to avoid needlessly and inefficiently establishing the connection 12 if the peer UE's supported radio layer parameters are incompatible with the connection's radio layer parameter requirements. Some embodiments may thereby advantageously conserve processing and radio resources that would otherwise be wasted due to incompatible radio layer parameters.

More particularly, as shown in FIG. 1, the UE 10 in some embodiments receives RRC signaling 16 from the peer UE 14, e.g., as part of the radio layer information exchange, in which case the exchange may be referred to as an RRC layer information exchange. The RRC signaling 16 in one embodiment indicates radio layer parameters 16A supported by the peer UE 14. In this case, the UE 10 may itself evaluate whether the radio layer parameters 16A indicated by the RRC signaling 16 as being supported by the peer UE 14 are compatible with the radio layer parameters required for the connection 12. If the supported radio layer parameters 16A are compatible with the required radio layer parameters, the UE 10 may determine to indeed establish the connection 12 towards the peer UE 14. Otherwise, if the supported radio layer parameters 16A are incompatible with the required radio layer parameters, the UE 10 may determine to not establish the connection 12 towards the peer UE 14.

In another embodiment, by contrast, the RRC signaling 16 itself indicates whether radio layer parameters supported by the peer UE 14 are compatible with radio layer parameters required for the connection 12 between the peer UE 14 and the UE 10. That is, rather than the UE 10 evaluating such radio layer parameter compatibility, the peer UE 14 performs such evaluation. The peer UE 14 may for instance perform this compatibility check based on RRC signaling 18 that the UE 10 transmits to the peer UE 14 indicating the radio layer parameters 18A required for the connection 12. In this case, then, the UE 10 may determine whether or not to establish the connection 12 based respectively on whether or not, according to the RRC signaling 16, radio layer parameters supported by the peer UE 14 are compatible with radio layer parameters 18A required for the connection 12.

Figure 2:
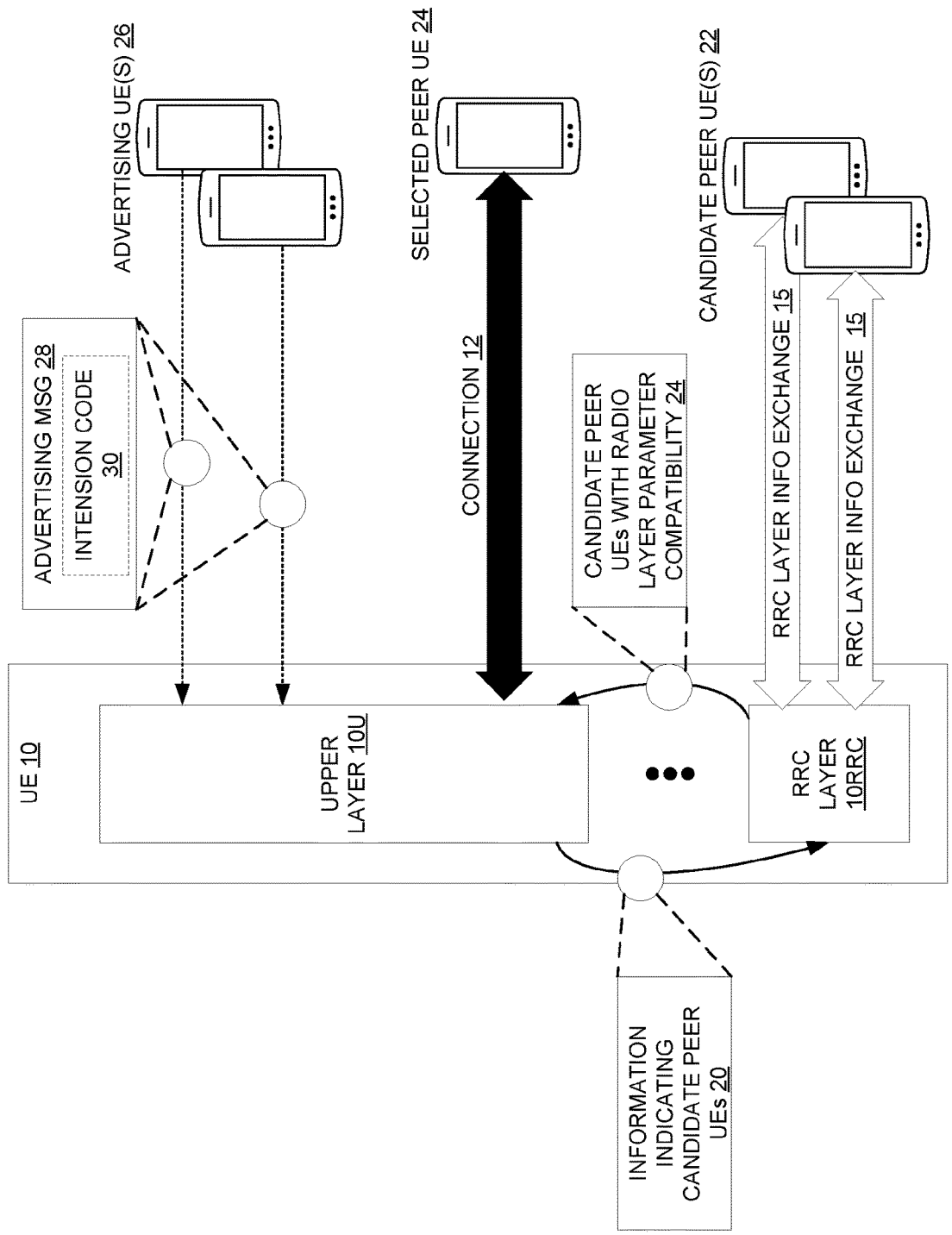
FIG. 2 is a block diagram of a user equipment with interaction between an RRC layer and an upper layer according to some embodiments.

Note that, in some embodiments, the determination of whether or not to establish the connection 12 may be performed by an upper layer 10U of the UE's protocol stack, based on the RRC signaling 16 received by radio layer(s) 10R (e.g., RRC layer) of the UE's protocol stack. That is, some cross-layer interaction is performed at the UE for connection establishment determination. FIG. 2 illustrates one example.

As shown in FIG. 2, the upper layer 10U transmits information 20 to the RRC layer 10RRC indicating one or more peer UEs 22 as candidates for connection establishment. Then, for each of the candidates 22, the RRC layer 10RRC triggers the RRC layer information exchange described above with respect to peer UE 14, i.e., an exchange of information via RRC signaling in order to determine radio layer parameter compatibility. The UE 10 via such exchange therefore receives, from each peer UE 22 that is a candidate for connection establishment, RRC signaling that indicates radio layer parameters supported by the peer UE or indicates whether radio layer parameters supported by the peer UE are compatible with radio layer parameters required for a connection between the peer UE and the UE. Based on the RRC layer information exchange with each candidate 22, the UE's RRC layer 10RRC determine whether radio layer parameters supported by the peer UE are compatible with radio layer parameters required for a connection between the peer UE and the UE 10. The RRC layer 10RRC then transmits to the upper layer 10U information 24 indicating at least one of the one or more peer UEs 22 that supports radio layer parameters which are compatible with radio layer parameters required for a connection between the peer UE and the UE 10. The upper layer 10U may determine whether or not to establish a connection with one or more of the UEs indicated by the RRC layer 10RRC as having radio layer parameter compatibility. FIG. 2 in this regard shows as an example that the upper layer 10U selects a peer UE 24 towards which to establish a connection 12.

In these and other embodiments, the upper layer 10U may make the initial determination as to which peer UEs are candidates 22 for connection establishment. FIG. 2 for instance shows that the upper layer 10U makes this determination based on advertisement messages 28 that the upper layer 10U receives. As shown, one or more advertising UEs 26 transmits advertisement message(s) 28 to the UE 10. The UE's upper layer 10U determines, based on the advertisement message(s) 28, which of the one or more advertising UEs 26 are candidates for connection establishment.

For example, in some embodiments, an advertisement message 28 from an advertising UE 26 may indicate a speed of the advertising UE 26, a location of the advertising UE 26, type of the advertising UE 26, a proximity of the advertising UE 26 to the UE 10, and/or a service of interest to the advertising UE 26. The UE's upper layer 10U may then for example determine which, if any, advertising UE 26 is a candidate for connection establishment based on that advertising UE having a certain speed, location, proximity, and/or service of interest.

Alternatively or additionally, an advertisement message 28 from an advertising UE 26 may include a so-called intension code 30 as shown in FIG. 2. An intension code 30 may indicate the advertising UE's intension for discovery, e.g., in terms of which UEs the advertising UE intends to discover. For example, an intension code 30 may indicate a direction (relative to the advertising UE 26) in which the advertising UE 26 intends to discover a UE to which to connect. The direction may be generally specified for instance as front, back, left, or right. In this case, then, the UE's upper layer 10U may determine whether or not an advertising UE 26 is a candidate for connection establishment based respectively on whether the UE is or is not in the direction in which the advertising UE 26 intends to discover a UE to which to connect (as indicated by the intension code 30). Alternatively or additionally, an intension code 30 may indicate a distance or radius from the advertising UE 26 within which the advertising UE 26 intends to discover a UE to which to connect. The distance or radius may for instance be specified in terms of meters. In this case, the UE's upper layer 10U may determine whether or not an advertising UE 26 is a candidate for connection establishment based respectively on whether the UE is or is not within the distance or radius from the advertising UE within which the advertising UE 26 intends to discover a UE to which to connect (as indicated by the intension code 30). In still other embodiments, an intension code 30 may identify a service for which the advertising UE intends to establish a connection with a UE.

Consider now additional details of some embodiments herein, e.g., presented in a context of V2X communication.

The Third Generation Partnership Project (3GPP) has addressed device to device (D2D) communications. In particular, 3GPP TS 23.303 Release 12 describes proximity services (ProSe) that include ProSe Direct Discovery and ProSe Direct Communication. Release 12 also introduces the concept of Sidelink (SL) which allows communication between two or more nearby user equipment (UEs), using Evolved Universal Terrestrial Radio Access (E-UTRA) technology but via a PC5 interface instead of traversing any network node.

ProSe Direct Discovery is defined as a process run by the UE that detects and identifies another UE in its proximity. ProSe Direct Communication is defined by the communication established between two UEs using Evolved Terrestrial Radio Access Network (E-UTRAN) or Wireless Local Area Network (WLAN). ProSe Direct Discovery is needed for unicast/multicast transmission over the SL and it can be used for subsequent actions e.g. to initiate direct link communication if the SL has been established.

Currently, there are two ProSe Direct Discovery models, model A ("I am here") and model B ("who is there?"/"are you there?"). Model A defines two roles for the ProSe-enabled UEs that are participating in the ProSe Direct Discovery. The first role is the announcing UE. This first role is played by the UE that announces certain information that could be used by other UEs in the proximity that have permission to discover. The second role is the monitoring UE. This second role is played by the UE that monitors certain information of interest in proximity of the announcing UEs. In this model A, the announcing UE broadcasts discovery messages and the monitoring UEs that are interested in these messages read them and process them.

Model B defines two roles for the ProSe-enabled UEs that are participating in ProSe Direct Discovery. The first role is the discoverer UE. This first role is played by the UE that transmits a request containing certain information about what it is interested to discover. The second role is the discoveree UE. This second role is played by the UE that receives the request message and can respond with some information related to the discoverer's request. This model B is equivalent to "who is there/are you there" since the discoverer UE sends information about other UEs that the discoverer UE would like to receive responses from, e.g. the information can be about a ProSe Application Identity corresponding to a group and the members of the group can respond.

Currently, at the radio layer of the UEs, the discovery transmissions are carried out on a specific set of periodic time-frequency resources that are configured by an eNodeB (eNB) in broadcast fashion (i.e. in SIB19) or in dedicated Radio Resource Control (RRC) signalling for UEs in a connected mode. To ensure out-of-coverage operations, discovery resources can also be pre-configured in the UE to be used when there is no network coverage. The discovery transmission consists of a 224 bits transport block (TB) size allocated in 2 contiguous Physical Resource Blocks (PRBs).

At the Medium Access Control (MAC) layer level of the UEs, discovery transmissions are delivered on a dedicated channel, i.e. Sidelink Discovery Channel (SL-DCH), which is conveyed in a transparent MAC Protocol Data Unit (PDU), i.e. the discovery MAC PDU consists solely of a MAC Service Data Unit (SDU) whose size is aligned to a TB.

Moreover, 3GPP TS22.185 Rel-14 and Rel-15, describe that the extensions for the D2D work consist of supporting vehicle-to-anything (V2X) communication, which includes any combination of direct communication between vehicles, pedestrians and infrastructure. In particular, there are several different V2X use cases or V2X scenarios that are Long-Term Evolution (LTE) based, such as a) vehicle-to-vehicle (V2V) covering LTE-based communication between vehicles, either via interface Uu or PC5; b) vehicle-to-pedestrian (V2P) covering LTE-based communication between a vehicle and a device carried by an individual (e.g. handheld terminal or UE carried by a pedestrian, cyclist, driver or passenger) either via interface Uu or PC5; and c) vehicle-to-infrastructure/network (V2I/N) covering LTE-based communication between a vehicle and a roadside unit/network, wherein a roadside unit (RSU) is a transportation infrastructure entity (e.g. an entity transmitting speed notifications) that communicates with V2X capable UEs over interface PC5, and wherein V2N communication is performed on the interface Uu.

Also, the V2X communication is the enabling technology for an Intelligent Transport System (ITS) based on the European Telecommunications Standards Institute (ETSI) standards, where information distributed by Cooperative Awareness Messages (CAM) is commonly used by some safety related services (e.g. Approaching Emergency Vehicle, Slow Vehicle Warning, etc.). The ETSI ITS standards describe that by receiving CAMs, the V2X device is aware of other device(s) in its neighborhood area as well as their positions, speed (including velocity and direction), basic attributes and basic sensor information. At the receiver side, reasonable efforts can be taken to evaluate the relevance of the messages and the information. This allows the receiver to get information about its situation and act accordingly.

ETSI ITS standards also include the possibility for UEs to advertise their presence with periodic beacon transmissions. Each beacon includes a set of possible information such as the address of the sender, the ITS station type (e.g. pedestrian, bike, car, truck, etc.), speed, location etc., similar to the CAM message. By receiving such beacons, each receiver, such as an UE, builds up a table of neighbors and their related characteristics.

In this situation, V2X communication may take advantage of a network (NW) infrastructure, when available, but at least basic V2X connectivity should be possible even in case of lack of network coverage. Providing an LTE-based V2X interface may be economically advantageous because of the LTE economies of scale and it may enable tighter integration between communications with the NW infrastructure (V2I), pedestrian (V2P) and other vehicles (V2V) communications, as compared to using a dedicated V2X technology.

Advanced V2X services such as platooning and cooperative sensor sharing may require unicast and multicast V2V communications. The New Radio (NR) V2X Sidelink (SL) technology is promised to fulfil such requirement of providing unicast and multicast V2V connectivity. However, the existing Sidelink Discovery framework is heretofore suboptimal for NR V2X communications. For example, if the radio layer characteristic at a UE does not meet the Quality of Service (QoS) requirements applicable for a connection, it is meaningless to establish such a connection in NR.

Some embodiments herein provides a SL autonomous discovery framework which consists of both radio layer and application layer for SL discovery. The framework enables the SL discovery both considering the discovery interest and the radio capabilities of discovery UEs and supports conveying and exchanging the radio layer UE info (e.g., UE capability info, L2 ID) for the purpose of establishing NR V2X unicast/multicast connection.

Moreover, some embodiments introduce determining when the V2X communication can be established by the upper layer based on an advertising message that preferably comprises an intension code.

Therefore, some embodiments describe a set of procedures, methods and apparatus for vehicle-to-anything (V2X) communication based on SL discovery and radio link establishment that convey and exchange radio layer information enabling V2X NR SL unicast and multicast connectivity and solving the drawbacks of the suboptimal prior art Sidelink Discovery framework.

In some embodiments, vehicle-to-anything (V2X) communication is established between at least two user equipment (UE) of a plurality of neighboring user equipment (UEs). The at least two UE may for instance include at least one receiver user equipment (Rx UE) (e.g., as an example of UE 10 in FIG. 1) and at least one transmitter user equipment (Tx UE) (e.g., as an example of peer UE 14 in FIG. 1). Any of these UEs may be placed in, or be a part of, a vehicle and/or network infrastructure. Or, any UE may be associated with a person (including any handheld UE carried by a pedestrian, cyclist, driver or passenger). Moreover, any UE can operate as Rx UE and/or Tx UE depending on the UE requirements.

Figure 3:
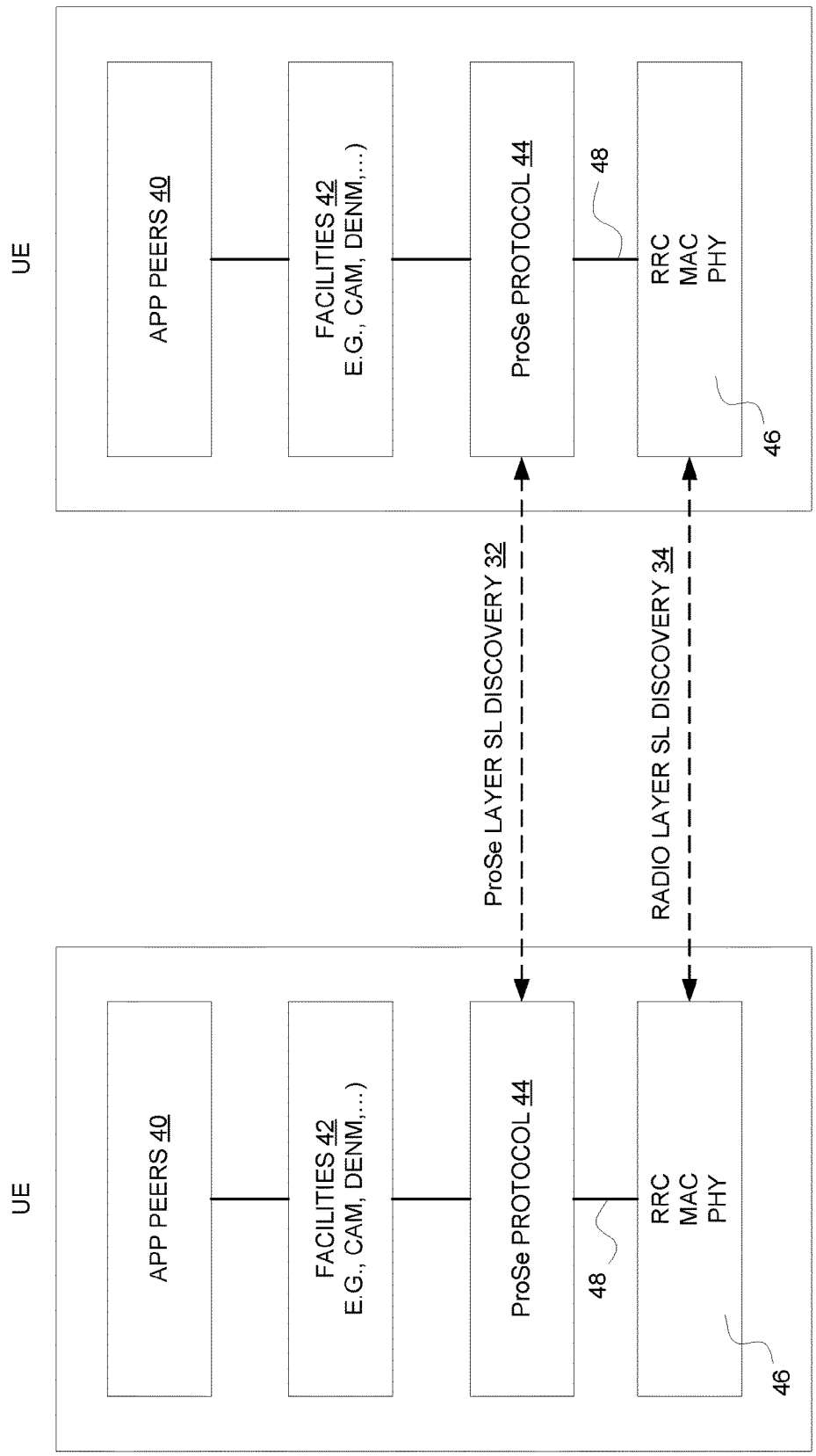
FIG. 3 schematically illustrates Sidelink discovery layers between two user equipment.

FIG. 3 illustrates a proposed method for V2X communication based on Sidelink (SL) discovery, emphasizing the schematics of the layers of two user equipment (UE) according to some embodiments.

As shown in FIG. 3, two UEs each include an application layer 40, a facilities layer 42 (e.g., for CAM, DENM, etc. protocols), a ProSe protocol layer 44, and radio layers in the form of RRC, MAC, and PHY layers. The UEs also each implement a cross-layer protocol 48 between the ProSe layer and the radio layers.

The proposed V2X communication method is based on a Sidelink (SL) discovery including Proximity Services (ProSe) layer Sidelink discovery 32 and/or radio layer SL discovery 34. The radio layer SL discovery 34 may provide a single framework to discover proximity UE with interested services and exchange radio layer UE capability information among the discovery UE. The ProSe layer Sidelink discovery 32 cannot be used for link establishment reliably according to some embodiments, since it cannot achieve the exchange of radio layer information. However, the ProSe layer Sidelink discovery 32 as well as the radio layer SL discovery 34 can carry an intension code contained, respectively, in a ProSe message or Radio Resource Control (RRC) message.

Moreover, the ProSe Protocol function may be seen as a logical function provided by an application module above radio (RAN) layers, e.g. defined as part of the geo-networking procedures or at the facility layer in the ETSI ITS framework.

Therefore, the method enables radio layers such as the Radio Resource Control (RRC) layer and the Medium Access Control (MAC) layer of the UEs to trigger Sidelink discovery. Consequently, it allows to the UE exchanging non-radio related information via upper layers and exchanging radio related information via radio layers.

Figure 4:
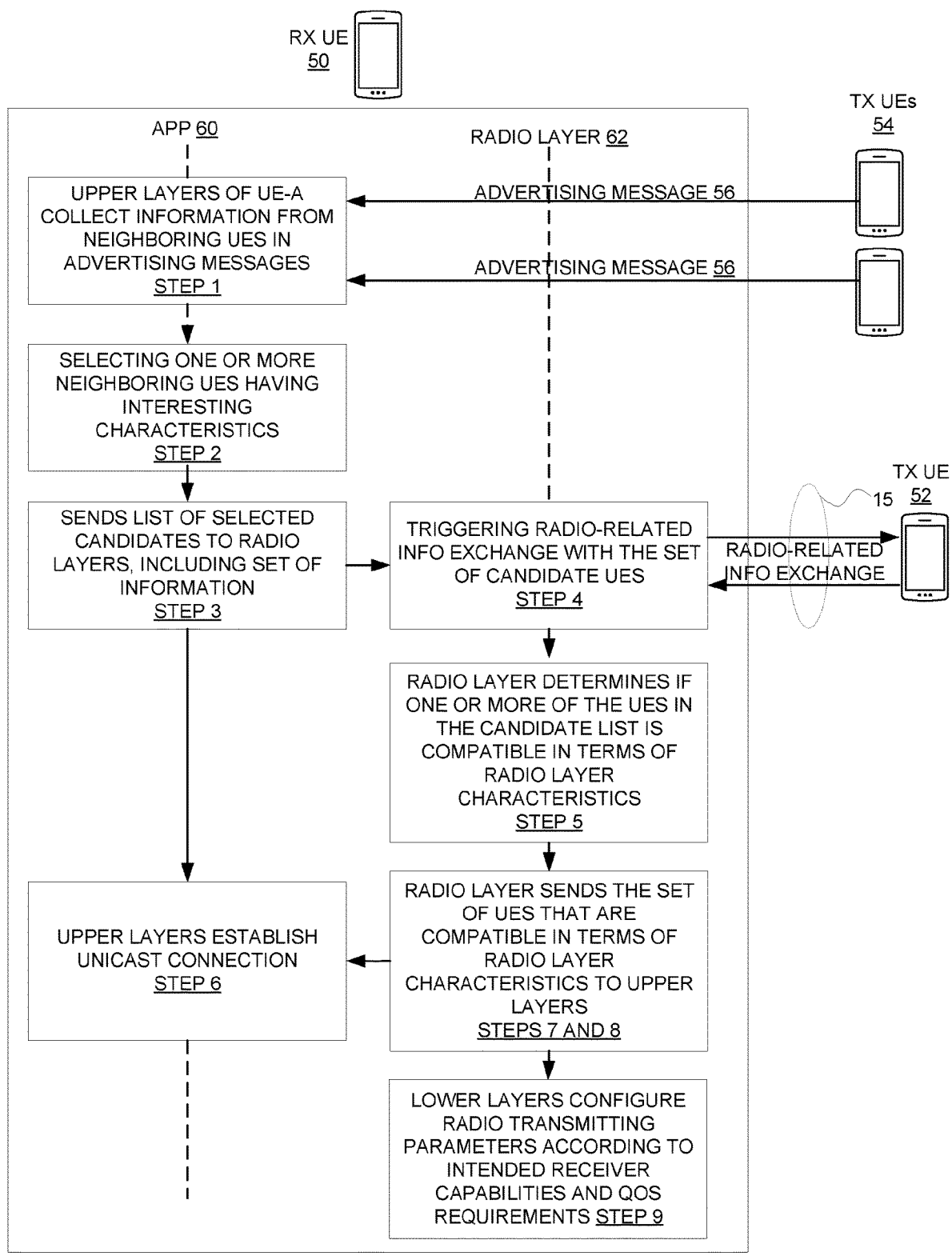
FIG. 4 schematically illustrates discovery and connection establishment according to some embodiments.

FIG. 4 illustrates a proposed method for performing a V2X communication according to some embodiments. As shown, the V2X communication is established between at least one Rx UE 50 and at least one Tx UE 52 of a plurality of transmitter user equipment (Tx UEs) 54. The at least one Tx UE 52 and at least one Rx UE 50 as well as the plurality of transmitter user equipment (Tx UEs) 54 can be referred to as proximity User Equipment or User Equipment (UEs).

In a first step, the method comprises transmitting, by the Tx UE 52, 54, an advertising message 56, and collecting, by the Rx UE 50, the advertising message 56 from all the plurality of UE 54 in its proximity. In some embodiments, the advertising messages 56 are beacons periodically transmitted to surrounding Rx UEs by the Tx UEs 54 via radio layers (RRC signalling or MAC signalling).

In some embodiments, an advertising message 56 comprises a discovery related message. The discovery related message comprises at least one element selected form the group consisting of: a discovery request, a discovery announcement, a SL discovery request message, a SL discovery response message, or a SL discovery confirmation message.

In some embodiments, this message 56 may be sent and terminated into upper layers 60, and some other messages are terminated in radio layers 62. For example, upper layers 60 may be used to convey non-radio related information such as location, service of interest, UE type (car, pedestrian, truck, etc), while some other messages at radio layer 62 are exclusively used to convey radio related information, such as UE capability, desired radio parameter configuration, Quality of Service (QoS) requirement of the service to be transmitted, etc The discovery related message comprises a set of non-radio layer related information and/or a set of radio layer related information.

In some embodiments, non-radio layer related information comprises an intension code, a proximity/location, a speed, a service of interest etc. of the plurality of transmitter Tx UEs 54 that are in the proximity of the Rx UE 50.

In some embodiments, the upper layers, e.g. a logical function in the application layer, of the UE(s) are in charge of determining the address of the UE(s) with which a unicast/multicast connection may be established. This decision of which UE(s) to connect with depends on the set of information non-radio layer related.

In some embodiments, an advertising message 56 comprises only non-radio layer related information.

In a second step, the method comprises, in response to the information of the advertising messages 56, selecting by the upper layers 60 of a Rx UE 50 one or more Tx UE 54 having interesting characteristics and determining a list of candidate peer that comprises the Tx UEs with matching characteristics from the information in the advertising message 56. For example, matching characteristics may be non-radio related information broadcasted by the Tx UE 54 that can be used by the Rx UE 50 in different cases, such a location, speed, or service.

In a third step, the method comprises indicating, by the upper layers 60 of Rx UE 50, to the radio layers 62 of Rx UE 50 the list of candidate peers and certain associated information. Such information may include the same set or a subset of the information collected by Rx UE 50 from neighboring Tx UEs 54 in the advertising messages 56. Such information may also include the link-layer (layer-2) address.

In a fourth step, the method comprises, in response to receiving the list of candidate peers, triggering radio layer related information exchange with the set of candidates UEs and performing radio layer related information exchange.

In some embodiments, the set of radio layer related information comprises Rx UE capabilities (e.g. Multiple Input Multiple Output (MIMO) capabilities, Release version, etc), QoS requirements for the service of interest, etc.

In some embodiments, the set of radio layer related information may be conveyed via RRC, MAC or Sidelink control information signalling on Physical Sidelink Control Channel (PSCCH).

In a fifth step, the method comprises, in response to receiving the corresponding radio layer related information by the radio layer 62 of Rx UE 50 from one or more of the Tx UEs 54 in the list of candidate peers, determining if one or more of the Tx UEs 54 in the list of candidate peers is compatible in terms of radio layer characteristics. Alternatively, the method may comprise receiving, by the Rx UE 50, from each of one or more of the Tx UEs in the list of candidate peers, a confirmation message (such as an ACK) indicating that there is a matching between the radio layer related information of the Tx UE and the Rx UE 50. Here, such matching in some embodiments means that a unicast/multicast connection can be established between the Rx UE 50 and one or more of the Tx UEs in the list of candidate peers. The unicast/multicast connection establishment in some embodiments consists of configuring radio layers with a set of transmitting parameters (such as MIMO configuration, MCS/TBS configuration) that matches the capabilities and QoS level indicate by Rx UE 50.

Alternatively, those UEs having radio-related parameters which do not match with Rx UE 50 do not reply, or reply with a negative confirmation (such as a NACK).

Regardless, this radio layer related information exchange as shown in FIG. 4 may be an example of the exchange 15 described in FIG. 1.

In a sixth step, the method comprises, upon the radio layer 62 of Rx UE 50 receiving the radio layer related information, establishing a unicast/multicast connection towards one or more of the Tx UEs in the list of candidate peers having matching radio layer related information (e.g. for those Tx UEs that signaled a confirmation message in the fifth step, or that signaled radio layer related information that is compatible with the desired radio requirements, such as capability, level of channel interference/congestion, etc.). The unicast/multicast connection establishment in some embodiments consists of configuring radio layers 62 of the Rx UE 50 with a set of transmitting parameters (such as MIMO configuration, MCS/TBS configuration, etc.) that matches the capabilities and QoS level for the intended receivers in the list of candidate peers.

More particularly, in a seventh step, the method comprises creating by the radio layer 62 of Rx UE one or more sets for each Tx UE towards which a unicast/multicast connection establishment can be created, i.e. sets of Tx UE that are radio-compliant. Each such set is a subset of the initial candidate set provided in the first step by upper layers. Each set may consist of a pair of 2 UEs (Rx UE and Tx UE) for which unicast connection is possible. There might be also one or more sets grouping all UEs towards which multicast connection is possible, where each multicast connection is intended for UEs interested in the same type of service.

In an eighth step, the method comprises the radio layers 62 of the Rx UE 50 passing to upper layers one or more of the possible sets determined in the seventh step. The upper layers 60 of the Rx UE 50 may then take the final decision to establish a unicast/multicast connection towards the UEs signaled in sixth step, and allocates a unicast/multicast address for the intended receivers. The upper layers may also signal again to lower layers the set of UEs towards which unicast/multicast connection can be established, and radio layers will then configure the transmitting parameters accordingly in a ninth step.

In some embodiments, this method can be part of a SL autonomous discovery procedure. For example, in some embodiments, before transmitting the advertising message, a SL discovery service authorization to the network (e.g., ProSe function and ProSe App server at ProSe protocol layer) is required.

In some embodiments, the SL autonomous discovery procedure may include a specific discovery intention of Tx UE from its application layer or facilities layer which is mapped to the intention code. In some embodiments, the intension code is a commonly known expression shared among all UEs, including both Rx UE and the Tx UE.

In some embodiments, the translation from specific discovery intention into an intention code is done at the ProSe Protocol layer at the network. Then, the discovery request message at the radio layer carries a V2X SL discovery intention code, which is transmitted from the Tx UE to the surrounding UEs. In one embodiment, the intention code is constructed by some sort of service ID and two other parameters such as the intended discovery direction and the radius/distance from the Tx UE to the potential Rx UE.

Figure 5:
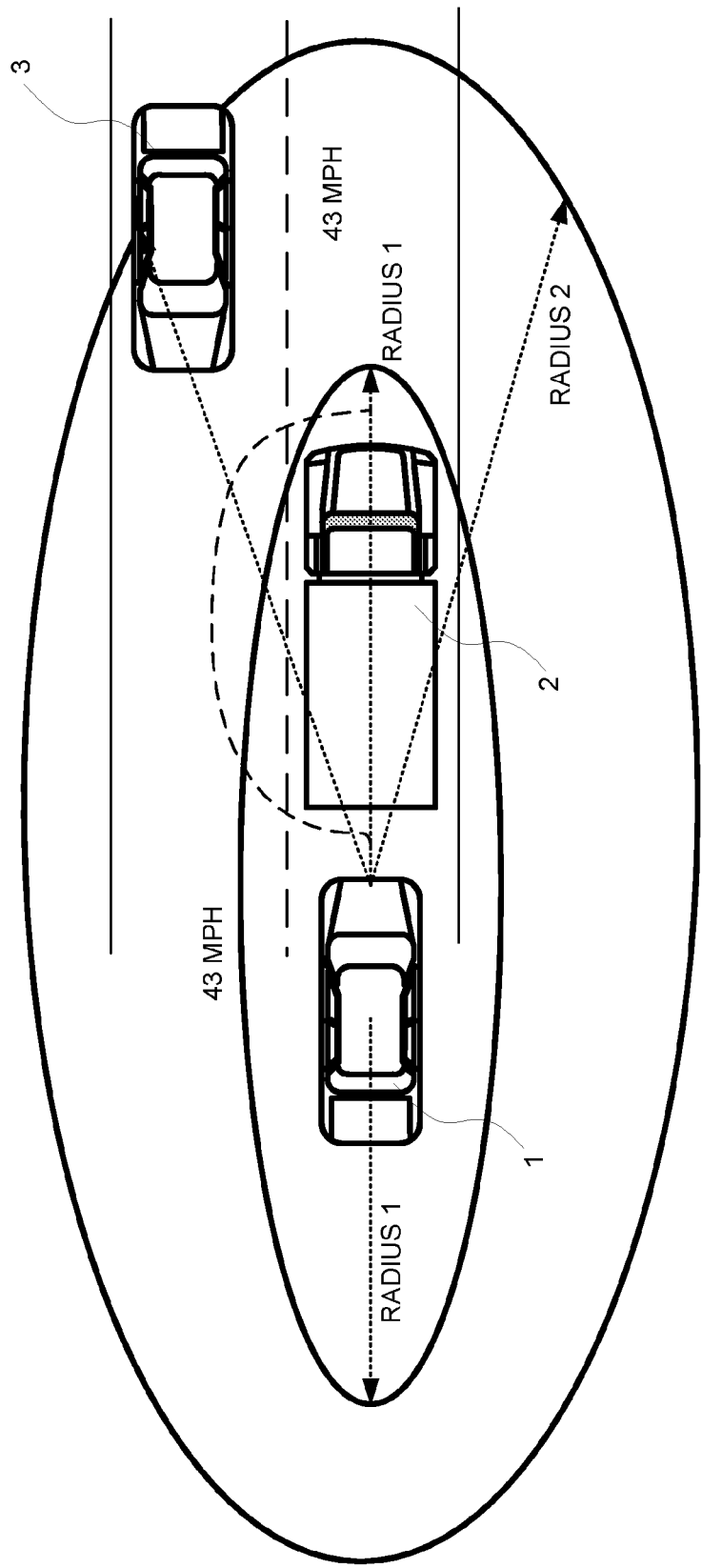
FIG. 5 schematically illustrates an application for an intension code according to some embodiments.

This intension code can be used for example as shown in FIG. 5. As shown, the first vehicle (1) comprising the Tx UE wants to perform a SL discovery before it performs the autonomous overtaking of the truck (2) that comprises a first Rx UE without crashing against a second vehicle (3) that comprises a second Rx UE. Examples of the intention codes are as follows:

Examples for Cooperative Sensor Sharing service:
Intention code 1=discovery intention "Discover the front vehicles/nodes with a radius of 20 meters"
Intention code 2=discovery intention "Discover the front vehicles/nodes with a radius of 50 meters"
Intention code 3=discovery intention "Discover the back vehicles/nodes with a radius of 20 meters"
Intention code 4=discovery intention "Discover the back vehicles/nodes with a radius of 50 meters"
Examples for Cooperative Lane Merging Service:
Intention code 5=discovery intention "Discover the front vehicles/nodes with a radius of 100 meters"
Intention Code 6=discovery intention "Discover the front vehicles/nodes with a radius of 150 meters"

The different intention codes from the Tx UE imply different SL discovery outcomes, and they may also imply different matching characteristics according to different situations of the UE. With the intention code for discovering the front vehicles with a radius 1, only the truck (2) in front of the vehicle (1) comprising a Tx UE is discovered in the example of FIG. 5. By contrast, with the intention code for discovering the front vehicles with a radius 2, both the truck (2) in front and the second vehicle (3) in the opposite lane are discovered. Thus, the intention code gives full flexibility and high granularity to the vehicle (1) comprising a Tx UE to discover all sets of UEs or vehicles according to its interest to discover. In this example, to perform the autonomous overtaking of the front truck (2), the first vehicle (1) with Tx UE has to perform a discovery with radius 2, since the second vehicle (3) in the opposite lane plays a vital role in the overtaking process.

The above intention codes may also be intended as service-specific IDs, and provided by upper layers above radio layers. Such service IDs maybe the services for which the UE is interested in, or that the UE is available to provide to other UEs.

In one method, the intention code is indicated by upper layers and conveyed in the radio layer messages, e.g. in RRC or MAC, to indicate the service of interest for the transmitting UE. In another method, the intention codes are conveyed directly from the TX application peer to the RX application peer, e.g. together with UE speed/location etc, and it is transparent to radio layers.

Figure 6:
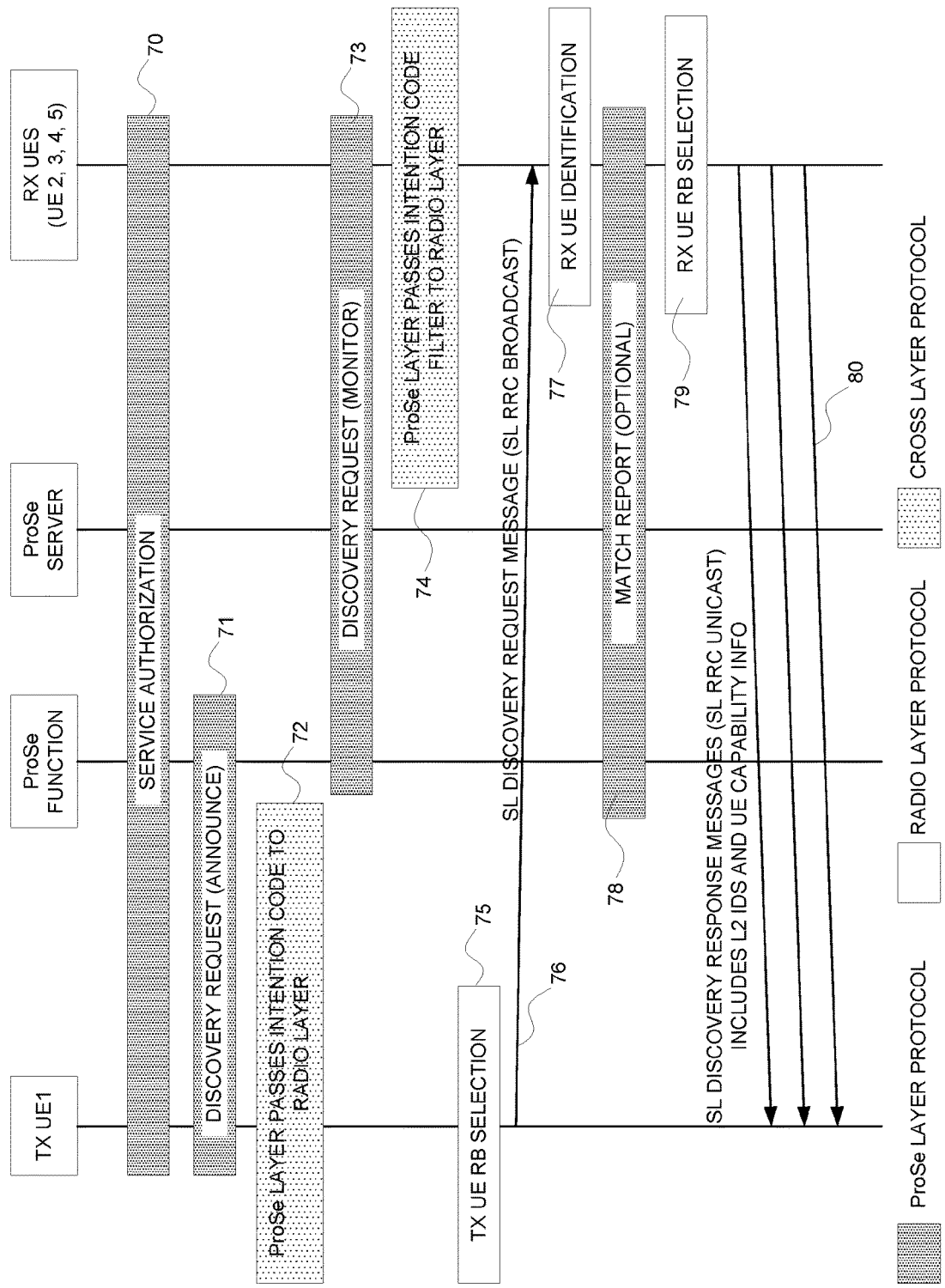
FIG. 6 schematically illustrates a Sidelink autonomous discovery procedure according to some embodiments.
Figure 7:
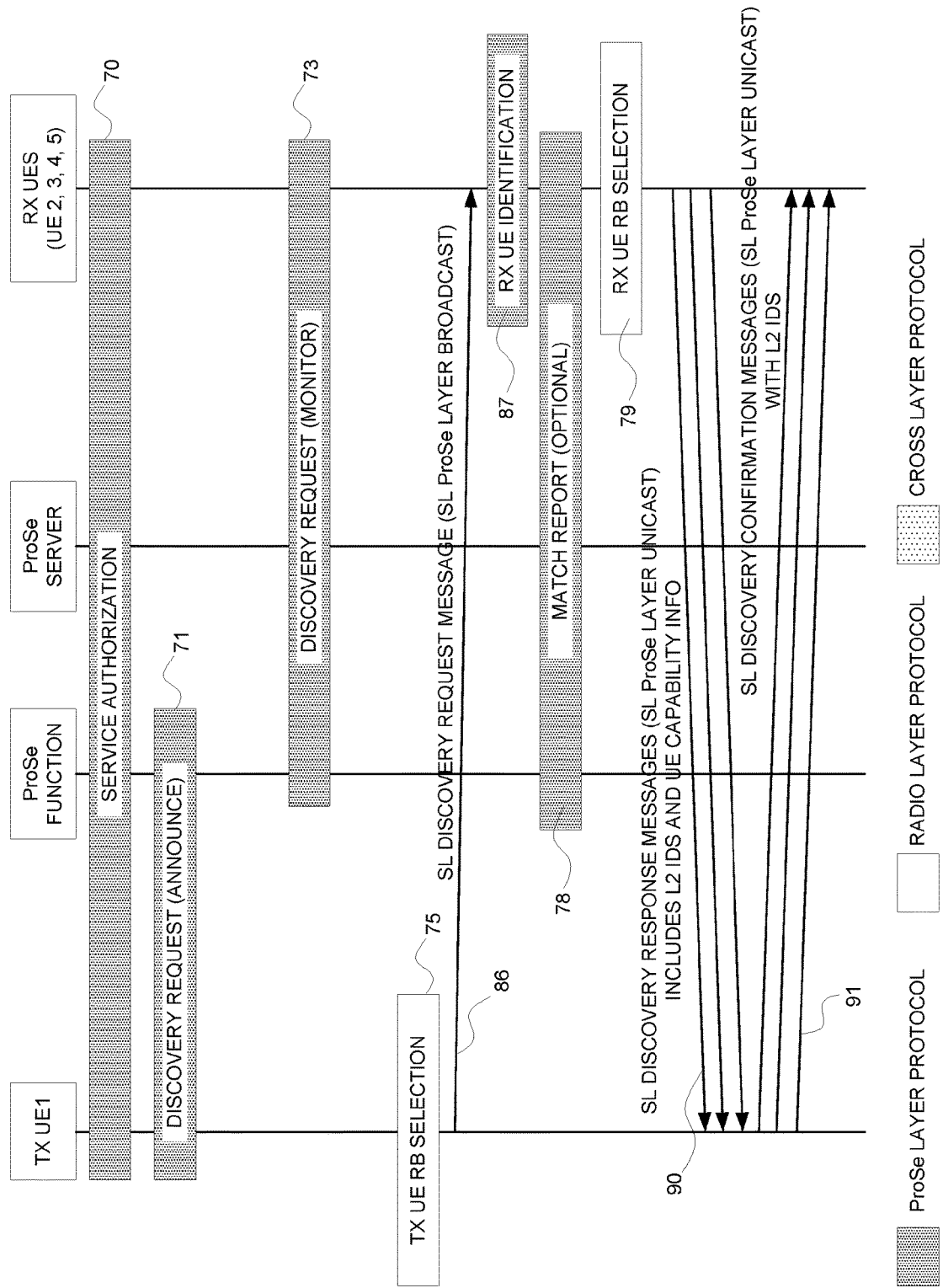
FIG. 7 schematically illustrates a Sidelink autonomous discovery procedure according to other embodiments.

Consider two variants of SL autonomous discovery procedures shown respectively in FIGS. 6 and 7.

In some embodiments, as shown in the FIG. 6, the protocol procedures for SL autonomous discovery are done at a radio layer e.g., at the RRC layer. Therefore, it is considered that some discovery related messages, e.g. the discovery request, the discovery announcement, the SL discovery request message, the SL discovery response message, the SL discovery confirmation message are sent using RRC signaling or MAC signaling at the radio layer.

In particular, FIG. 6 shows a SL discovery at radio layer, wherein all the UEs first perform the SL discovery service authorization to the network e.g., ProSe function and ProSe App server at ProSe protocol layer (Step 70). Secondly, the Tx UE makes the discovery announcement request to the network e.g., ProSe function and ProSe App server (Step 71). In this announcement request message, the Tx UE's specific discovery intention regarding the specific application layer ID or facilities layer ID is included into the ProSe protocol layer message. The network e.g., ProSe Function and ProSe App Server, translates the Tx UE's specific discovery intention (from the specific application layer ID or facilities layer ID) into an intention code and sends it back to the Tx UE. Alternatively, the UE can also do this translation from discovery intention to intension code by itself. Once the Tx UE gets the intention code, it passes the intention code from ProSe protocol layer to the RRC radio layer via the new interface between the ProSe protocol layer and RRC radio layer internally located within the UE (Step 72). The Tx UE can also pass other application context information from ProSe protocol layer to RRC radio layer e.g., the required/adopted autonomous level information (Rx UE may only respond if it has the same or higher supported autonomous level than that indicated by Tx). At the Rx UEs' side, each of the Rx UEs perform the discovery monitoring request by contacting the network e.g., the ProSe function and ProSe app server (Step 73).

Each of the Rx UEs is provided an intension code filter from the network e.g., the ProSe function which translates the intension code to a set of specific discovery intentions. The content of the intension code filter per Rx UE can depend on the UE's pre-configured interested application layer or facilities layer service IDs. It can also depend on the active running application layer or facilities layer services at the Rx UE. In such a way, the radio layer can use the intension code filter and match the relevant interested Tx UEs' intension code. Accordingly, the ProSe layer passes the intension code filter to the radio layer (Step 74).

Upon completing this preparation phase, discovery radio resource selection is performed at MAC layer (Step 75) to broadcast the RRC layer SL discovery request message to the proximity potential receiving UEs over the PC5 interface (Step 76). One embodiment of the content of the SL discovery request message can consist of SL discovery intension code, UE location info, UE driving velocity and direction, and the Tx UE radio capability information. Tx UE L2 global ID is also included in the SL discovery request message or in the MAC header. One embodiment of Tx UE's radio capability information can be the UE processing latency capability, the UE MIMO capability, the UE's supported carrier frequencies, the UE's supported CA band combinations, the UE's supported MCS schemes.

Upon receiving the SL discovery request RRC message from the Tx UE, the potential Rx UEs identify whether the intention code carried in discovery request message matches its intention code filter (Step 77). If yes, it also compares the Tx UE's location & driving velocity & direction in the discovery request message against its own location & driving direction. If this comparison fits to the Tx UE's intension code i.e., fit to Tx UE intended discovery radius, then this potential UE is identified as Rx UE. The identified Rx UE optionally sends a match report to the network (Step 78), e.g., the ProSe function and ProSe App server at the ProSe protocol layer. The match report shall include discovery intention code and Rx UE identity at ProSe Protocol layer. Secondly, radio resource selection is performed at MAC layer (Step 79) to unicast/broadcast the RRC layer SL discovery response message to the Tx UE over the PC5 interface (Step 80).

One embodiment of the content of the SL discovery respond message can be the Rx L2 global ID, the Tx L2 global ID, and the Rx UE radio capability information, if the discovery response message is broadcast RRC signaling. The Rx L2 global ID, the Tx L2 global ID can also be included in the MAC header, if the discovery response message is unicast RRC signaling.

One embodiment of Rx UE's radio capability information can be the UE processing latency capability, the UE MIMO capability, the UE's supported carrier frequencies, the UE's supported CA band combinations, and/or the UE's supported MCS schemes.

In other embodiments, as shown in the FIG. 7, the protocol procedures for SL autonomous discovery are done in the upper layers. In these embodiments, therefore, FIG. 7 shows that a SL discovery request message 86 may be sent and terminated into upper layers 60; namely, the ProSe layer. And a SL discovery response message 90 may be sent and terminated in upper layers 60 as well. Other messages are terminated in radio layers 62. For example, upper layers may be used to convey non-radio related information such as location, service of interest, UE type (car, pedestrian, truck, etc), while some other messages at radio layer are exclusively used to convey radio-related information, such as UE capability, desired radio parameter configuration, QoS requirement of the service to be transmitted, etc. In this context, then, RX UE identification 87 may take place at the ProSe layer, instead of the radio layer as in FIG. 6.

Additionally, FIG. 7 shows the introduction of the confirmation message 91. In some embodiments, the confirmation message comprises the local L2 UE ID that can be used at the Rx UEs to differentiate different Rx UEs. Compared to the case of using global L2 ID, SL discovery confirmation messages are additionally sent from the Tx UE to each of the Rx UEs. In this case, the Tx UE firstly receives the Rx UEs global L2 ID in the discovery response messages and then allocates the local L2 ID to each Rx UEs, such that the local L2 ID is used in the follow-up unicast or multicast communication phase. Local L2 ID is shorter than global L2 ID, thus it has the advantage of reduced signaling overhead.

In another embodiment, in both the discovery procedures shown in FIGS. 6 and 7 respectively, additionally both the discovery request message and discovery response message can include the synchronization source signal. In this sense, the device-to-device synchronization is ensured both at the transmitter side and at the receiver side during the discovery process.

In some other embodiment, when in a partial network coverage case where a Tx UE is in coverage and some of its Rx UEs are out of coverage, the Rx UEs cannot perform discovery (monitor) request step due to the lack of Uu connectivity. Instead, the Rx UE maps/translates the discovery intention into the discovery intention code by itself. The Rx UE uses a pre-configured intention code filter and passes it to the RRC layer for discovery UE identification and transmitting discovery respond message. When Tx UE is out of coverage and some of its Rx UEs are in-coverage, the Tx UE does not perform discovery (announce) request due to the lack of Uu connectivity and instead the Tx UE maps/translates the discovery intention into the discovery intention code by itself. The Tx UE uses the pre-configured SL discovery intension code. Then the Tx UE performs the RRC layer procedures as shown in FIGS. 6 and 7. When both Tx Rx U and Rx UEs are out of coverage, both UEs map/translate the discovery intention into the discovery intention code by themselves. Both UEs use the pre-configured intention code and intention code filter respectively and performs RRC layer SL discovery procedures as shown in FIGS. 6 and 7.

Generally, then, embodiments herein include a method for performing a vehicle-to-anything (V2X) communication, wherein the V2X communication is established between at least two user equipment (UE) of a plurality of neighboring user equipment (UEs), being at least one a receiver user equipment (Rx UE) and at least one a transmitter user equipment (Tx UE). The method comprises transmitting, by at least one Tx UE, an advertising message. Also, the method comprises collecting, by the upper layer of the Rx UE, the least one of the advertising message, and in response to the advertising message determining, by the upper layer of the Rx UE, when to establish the V2X communication with the Tx UE.

In some embodiments, previously to transmitting the advertising message, the method comprises performing a service authorization by UEs at the network in order to establish the V2X communication.

In some embodiments, more than one advertising message is transmitting by more than one Tx UE and received by more than one Rx UE.

In some embodiments the advertising message comprises at least a Sidelink (SL) discovery related message.

In some embodiments the SL discovery related message comprises at least one element selected from the group consisting of: a SL discovery request message, a discovery request, a discovery announcement, a SL discovery request message, a SL discovery response message, a SL discovery confirmation message and any combination of the above.

In some embodiments the SL discovery related message comprises at least a set of non-radio layer related information, and/or a set of radio layer related information.

In some embodiments the advertising message comprises at least a set of non-radio layer related information, and/or a set of radio layer related information.

In some embodiments the set of non-radio layer related information comprise an intension code.

In some embodiments the set of non-radio layer related information further comprises at least: a proximity, a location, a speed, a service of interest of the Tx UE, or a combination of the above.

In some embodiments the set of radio layer related information comprise at least: a capability, a desired radio parameter configuration, or a Quality of Service (QoS) requirements of the service to be transmitted.

In some embodiments the SL discovery related messages are sent into the upper layer of the UE to convey the set of non-radio layer related information.

In some embodiments the SL discovery related messages are sent into the radio layers of the UE to convey the set of radio layer related information.

In some embodiments the method further comprises determining by upper layers of the Rx UE, a list of candidate peers that comprises at least one Tx UEs with which a unicast/multicast connection may be established based on the non-radio layer related information.

In some embodiments the upper layers of Rx UE indicate to the radio layers of Rx UE the list of candidate peers and an associated information.

In some embodiments the associated information comprises the same set or a subset of the information collected by the Rx UE from neighboring Tx UEs in the advertising messages.

In some embodiments the method comprises, in response to the advertising message, performing by the radio layer of Rx UE signals to the Tx UE of the list of candidates including a set of radio layer related information conveyed via Radio Resource Control (RRC), Medium Access Control (MAC) or Sidelink control information signaling on Physical Sidelink Control Channel (PSCCH).

In some embodiments the radio layer of Rx UE further establishes a unicast/multicast connection towards one or more of the UEs in the list of candidate peers.

In some embodiments the unicast/multicast connection establishment consists in configuring radio layers with a set of transmitting parameters that matches the capabilities and Quality of Service (QoS) level indicate by the Rx UE or by the Tx UE in the list of candidate peers.

In some embodiments the intension code is a known expression shared among all the UEs.

In some embodiments the intension code is constructed by at least a service ID.

In some embodiments the intension code is further constructed by at least one Tx parameter.

In some embodiments the Tx parameter comprises at least one element selected from the group consisting of: an intended discovery direction of the Tx UE, a radius from the Tx UE to the potential Rx UE, a distance from the Tx UE to the potential Rx UE, a speed of the Tx UE, a location of the Tx UE, and any combination of the above.

In some embodiments the intension code is constructed at the UE upper layers and conveyed by the lower layer or radio layer.

In some embodiments the intension code is constructed at the UE upper layers and conveyed directly by the Tx UE the Rx UE by peer-to-peer.

In some embodiments each intension code for the Tx UE implies different SL discovery outcomes at the Rx UE.

Embodiments herein also include a method performed by a transmitter user equipment (Tx UE) configured to perform a vehicle-to-anything (V2X), wherein the V2X communication is established between at least two user equipment (UE) of a plurality of neighboring user equipment (UEs), being those at least one a receiver user equipment (Rx UE) and the Tx UE. The method comprises transmitting, to the Rx UE, an advertising message.

In some embodiments, previously to transmitting the advertising message, the method comprises preforming a service authorization by UEs at the network in order to establish the V2X communication.

In some embodiments the advertising message comprises at least a Sidelink (SL) discovery related message.

In some embodiments the SL discovery related message comprises at least one element selected from the group consisting of: a SL discovery request message, a discovery request, a discovery announcement, a SL discovery request message, a SL discovery response message, a SL discovery confirmation message and any combination of the above.

In some embodiments the SL discovery related message comprise at least a set of non-radio layer related information, and/or a set of radio layer related information.

In some embodiments the advertising message comprises at least a set of non-radio layer related information, and/or a set of radio layer related information.

In some embodiments the set of non-radio layer related information comprise an intension code.

In some embodiments the set of non-radio layer related information further comprises at least: a proximity, a location, a speed or a service of interest of the Tx UE, or any combination of the above.

In some embodiments the set of radio layer related information UE comprise at least: a capability, a desired radio parameter configuration, or a Quality of Service (QoS) requirements of the service to be transmitted.

In some embodiments the SL discovery related messages are sent into the upper layer of the UE to convey the non-radio layer related information.

In some embodiments the SL discovery related messages are sent into the radio layers of the UE to convey the set of radio layer related information In some embodiments the method further comprises determining by upper layers of the Rx UE, a list of candidate peers that comprises at least one Tx UEs with which a unicast/multicast connection may be established based on the non-radio layer related information.

In some embodiments the upper layers of Rx UE indicate to the radio layers of Rx UE the list of candidate peers and an associated information.

In some embodiments the associated information comprises the same set or a subset of the information collected by the Rx UE from neighboring Tx UEs in the advertising messages.

In some embodiments the method comprises, in response to the advertising message, performing by the radio layer of Rx UE signals to the Tx UE of the list of candidates including a set of radio layer related information conveyed via Radio Resource Control (RRC), Medium Access Control (MAC) or Sidelink control information signaling on Physical Sidelink Control Channel (PSCCH).

In some embodiments the radio layer of Rx UE further establishes a unicast/multicast connection towards one or more of the UEs in the list of candidate peers.

In some embodiments the unicast/multicast connection establishment consists in configuring radio layers with a set of transmitting parameters that matches the capabilities and Quality of Service (QoS) level indicate by the Rx UE or by the Tx UE in the list of candidate peers.

In some embodiments the intension code is a known expression shared among all the UEs.

In some embodiments the intension code is constructed by at least a service ID.

In some embodiments the intension code is further constructed by at least one Tx parameter.

In some embodiments the Tx parameter comprises at least one element selected from the group consisting of: an intended discovery direction of the Tx UE, a radius from the Tx UE to the potential Rx UE, a distance from the Tx UE to the potential Rx UE, a speed of the Tx UE, a location of the Tx UE and any combination of the above.

In some embodiments the intension code is constructed at the UE upper layers and conveyed by the lower layer or radio layer.

In some embodiments the intension code is constructed at the UE upper layers and conveyed directly by the Tx UE the Rx UE by peer-to-peer.

In some embodiments each intension code for the Tx UE implies different SL discovery outcomes at the Rx UE.

Embodiments herein also include a method performed by a receiver user equipment (Rx UE) configured to perform a vehicle-to-anything (V2X) communication, wherein the V2X communication is established between at least two user equipment (UE) of a plurality of neighboring user equipment (UEs), being those the Rx UE and at least one a transmitter user equipment (Tx UE). The method comprises collecting the least an advertising message transmitted by the Tx UE, and in response to the advertising message determining, by the upper layer of the Rx UE, when to establish the V2X communication with the Tx UE.

In some embodiments, previously to transmitting the advertising message, the method comprises preforming a service authorization by UEs at the network in order to establish the V2X communication.

In some embodiments more than one advertising message is transmitting by more than one Tx UE and received by more than one Rx UE.

In some embodiments the advertising message comprises at least a Sidelink (SL) discovery related message.

In some embodiments the SL discovery related message comprises at least one element selected from the group consisting of: a SL discovery request message, a discovery request, a discovery announcement, a SL discovery request message, a SL discovery response message, and a SL discovery confirmation message.

In some embodiments the SL discovery related message comprise at least a set of non-radio layer related information, and/or a set of radio layer related information.

In some embodiments the advertising message comprises at least a set of non-radio layer related information, and/or a set of radio layer related information.

In some embodiments the set of non-radio layer related information comprise an intension code.

In some embodiments the set of non-radio layer related information further comprises at least: a proximity, a location, a speed, a service of interest of the Tx UE or any combination of the above.

In some embodiments the set of radio layer related information UE comprise at least: a capability, a desired radio parameter configuration, or a Quality of Service (QoS) requirements of the service to be transmitted.

In some embodiments the SL discovery related messages are sent into the upper layer of the UE to convey the non-radio layer related information.

In some embodiments the SL discovery related messages are sent into the radio layers of the UE to convey the set of radio layer related information In some embodiments the method further comprises determining by upper layers of the Rx UE, a list of candidate peers that comprises at least one Tx UEs with which a unicast/multicast connection may be established based on the non-radio layer related information.

In some embodiments the upper layers of Rx UE indicate to the radio layers of Rx UE the list of candidate peers and an associated information.

In some embodiments the associated information comprises the same set or a subset of the information collected by the Rx UE from neighboring Tx UEs in the advertising messages.

In some embodiments the method comprises, in response to the advertising message, performing by the radio layer of Rx UE signals to the Tx UE of the list of candidates including a set of radio layer related information conveyed via Radio Resource Control (RRC), Medium Access Control (MAC) or Sidelink control information signaling on Physical Sidelink Control Channel (PSCCH).

In some embodiments the radio layer of Rx UE further establishes a unicast/multicast connection towards one or more of the UEs in the list of candidate peers.

In some embodiments the unicast/multicast connection establishment consists in configuring radio layers with a set of transmitting parameters that matches the capabilities and Quality of Service (QoS) level indicate by the Rx UE or by the Tx UE in the list of candidate peers.

In some embodiments the intension code is a known expression shared among all the UEs.

In some embodiments the intension code is constructed by at least a service ID.

In some embodiments the intension code is further constructed by at least one Tx parameter.

In some embodiments the Tx parameter comprises at least one element selected from the group consisting of: an intended discovery direction of the Tx UE, a radius from the Tx UE to the potential Rx UE, a distance from the Tx UE to the potential Rx UE, a speed of the Tx UE, a location of the Tx UE and any combination of the above.

In some embodiments the intension code is constructed at the UE upper layers and conveyed by the lower layer or radio layer.

In some embodiments the intension code is constructed at the UE upper layers and conveyed directly by the Tx UE the Rx UE by peer-to-peer.

In some embodiments each intension code for the Tx UE implies different SL discovery outcomes at the Rx UE.

Embodiments herein also include corresponding apparatus, computer programs, and carriers such as non-transitory computer readable medium.

For example, embodiments include a transmitter user equipment (Tx UE) a transmitter user equipment (Tx UE) configured to perform a vehicle-to-anything (V2X), wherein the V2X communication is established between at least two user equipment (UE) of a plurality of neighboring user equipment (UEs), being those at least one a receiver user equipment (Rx UE) and the Tx UE, wherein the Tx UE is configured to transmitting, to the Rx UE, an advertising message. The Tx UE is also configured to perform the method of any previous method's embodiment.

Embodiments also include a transmitter user equipment (Tx UE) configured to perform a vehicle-to-anything (V2X), wherein the V2X communication is established between at least two user equipment (UE) of a plurality of neighboring user equipment (UEs), being those at least one a receiver user equipment (Rx UE) and the Tx UE The Tx UE comprises a processing circuitry and a memory, the memory containing instructions executable by the processing circuitry whereby. the Tx UE is configured to transmitting, to the Rx UE, an advertising message. Also, the memory contains instructions executable by the processing circuitry whereby the user equipment is configured to perform the method of any of previous method's embodiment.

Embodiments also include a first computer program comprising instructions which, when executed by at least one processor of transmitter user equipment, causes a transmitter user equipment (Tx UE) to carry out the method of any previous embodiments and a first carrier containing the first computer program, wherein the carrier is one of an electronic signal, optical signal, radio signal, or computer readable storage medium.

Embodiments also include a receiver user equipment (Rx UE) configured to perform a vehicle-to-anything (V2X) communication, wherein the V2X communication is established between at least two user equipment (UE) of a plurality of neighboring user equipment (UEs), being those the Rx UE and at least one a transmitter user equipment (Tx UE). The Rx UE is configured to collecting the least an advertising message transmitted by the Tx UE, and in response to the advertising message determining, by the upper layer of the Rx UE, when to establish the V2X communication with the Tx UE. The Rx UE is also configured to perform the method of any previous method's embodiment.

Embodiments also include a receiver user equipment (Rx UE) configured to perform a vehicle-to-anything (V2X) communication, wherein the V2X communication is established between at least two user equipment (UE) of a plurality of neighboring user equipment (UEs), being those the Rx UE and at least one a transmitter user equipment (Tx UE). The Rx UE comprises a processing circuitry and a memory, the memory containing instructions executable by the processing circuitry whereby the Rx UE is configured to collecting the least an advertising message transmitted by the Tx UE, and response to the advertising message determining, by the upper layer of the Rx UE, when to establish the V2X communication with the Tx UE. Also, the memory contains instructions executable by the processing circuitry whereby the Rx UE is configured to perform any of previous method's embodiment.

Embodiments also include a second computer program comprising instructions which, when executed by at least one processor of a receiver user equipment (Rx EU), causes the Rx UE to carry out any method's embodiments and a carrier containing the second computer program, wherein the carrier is one of an electronic signal, optical signal, radio signal, or computer readable storage medium.

Embodiments also include a system for performing a vehicle-to-anything (V2X) communication, wherein the V2X communication is established between at least two user equipment (UE) of a plurality of neighboring user equipment (UEs), being at least one a receiver user equipment (Rx UE) and at least one a transmitter user equipment (Tx UE)

The Tx UE is configured to transmit, to the Rx UE, an advertising message, and the Rx UE is configured to collect the least an advertising message transmitted by the Tx UE, and in response to the advertising message determine, by the upper layer of the Rx UE, when to establish the V2X communication with the Tx UE.

Figure 8:
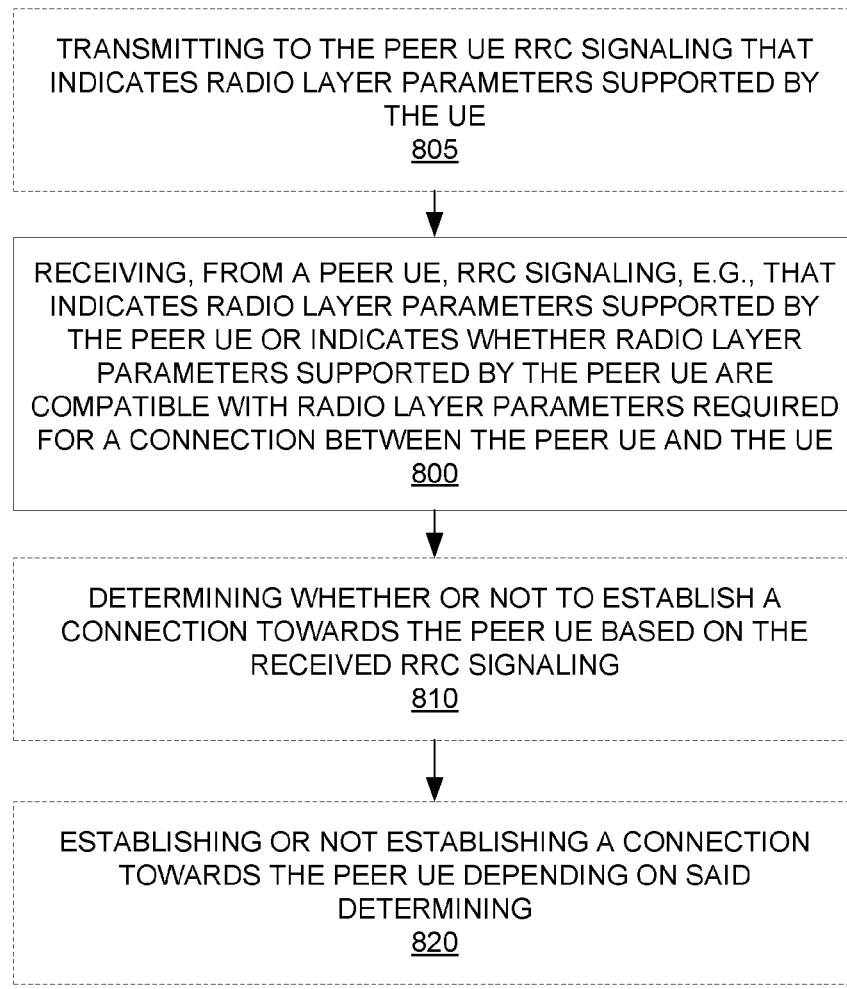
FIG. 8 is a logic flow diagram of a method performed by a UE according to some embodiments.

In view of the above modifications and variations here, FIG. 8 depicts a method performed by a UE 10 according to some embodiments. The method comprises receiving RRC signaling 16 from a peer UE 14 (Block 800). In some embodiments, the RRC signaling 16 indicates radio layer parameters 16A supported by the peer UE 14 or indicates whether radio layer parameters supported by the peer UE are compatible with radio layer parameters required for a connection 12 between the peer UE 14 and the UE 10. The method may further include determining whether or not to establish a connection 12 towards the peer UE 14 based on the received RRC signaling 16 (Block 810).

In some embodiments, the received RRC signaling 16 indicates radio layer parameters 16A supported by the peer UE. In this case, the determination of whether or not to establish the connection 12 may comprise evaluating, based on the received RRC signaling 16, whether radio layer parameters 16A supported by the peer UE are compatible with radio layer parameters required for a connection 12 between the peer UE 14 and the UE 10. The determination may then comprise determining whether or not to establish a connection 12 towards the peer UE 14, based respectively on whether or not, according to said evaluating, radio layer parameters 16A supported by the peer UE are compatible with radio layer parameters required for a connection 12 between the peer UE 14 and the UE 10.

In other embodiments, by contrast, the RRC signaling 16 indicates whether radio layer parameters supported by the peer UE are compatible with radio layer parameters required for a connection between the peer UE and the UE. In one embodiment, for instance, the determination of whether or not to establish the connection 12 comprises determining whether or not to establish a connection 12 towards the peer UE, based respectively on whether or not, according to the RRC signaling 16, radio layer parameters supported by the peer UE are compatible with radio layer parameters required for a connection between the peer UE and the UE. In some of these embodiments, the method may also comprise, before receiving the RRC signaling 16, transmitting to the peer UE RRC signaling 18 that indicates radio layer parameters 18A required for the connection 12 (Block 805).

Regardless, the method in some embodiments may also comprise establishing or not establishing a connection 12 towards the peer UE 14 depending on said determining (Block 820).

In some embodiments, the method further comprises, receiving, at an RRC layer of the UE, information 20 from an upper layer 10U of the UE 10 that indicates one or more peer UEs as candidates for connection establishment. The upper layer is higher than the RRC layer. In this case, the one or more peer UEs includes said peer UE 14. The method may also comprise, responsive to receiving the information 20 at the RRC layer, triggering an RRC layer information exchange 15 with each of the one or more peer UEs in which the UE receives from each peer UE RRC signaling 16 that indicates radio layer parameters supported by the peer UE or indicates whether radio layer parameters supported by the peer UE are compatible with radio layer parameters required for a connection between the peer UE and the UE. The method may further comprise determining, at the RRC layer 10RRC of the UE 10 and based on the RRC layer information exchange 15 with each of the one or more peer UEs, whether radio layer parameters supported by the peer UE are compatible with radio layer parameters required for a connection between the peer UE and the UE. The method may moreover comprise transmitting, from the RRC layer 10RRC to the upper layer 10U, information 24 indicating at least one of the one or more peer UEs that supports radio layer parameters which are compatible with radio layer parameters required for a connection between the peer UE and the UE. The upper layer 10U may then determine whether or not to establish a connection 12 towards the peer UE 14 based on the information transmitted 24 from the RRC layer 10RRC to the upper layer 10U.

Alternatively or additionally, the method may further comprise receiving, at an upper layer 10U of the UE 10 that is higher than an RRC layer 10RRC of the UE 10, one or more advertisement messages 28 from one or more advertising UEs 26. In this case, the one or more advertising UEs 26 include the peer UE 14. The method may also comprise determining, based on the one or more advertisement messages 28, which of the one or more advertising UEs 26 are candidates for connection establishment. The peer UE 14 may be determined to be a candidate for connection establishment.

In some embodiments, an advertisement message 28 from an advertising UE 26 indicates one or more of: a speed of the advertising UE; a location of the advertising UE; a type of the advertising UE; a proximity of the advertising UE to the UE; or a service of interest to the advertising UE.

Alternatively or additionally, an advertisement message 26 from an advertising UE includes an intension code 30. The intension code 30 may indicate one or more of: a direction, relative to the advertising UE, in which the advertising UE intends to discover a UE to which to connect; or a distance or radius from the advertising UE within which the advertising UE intends to discover a UE to which to connect. In this case, then, determining which of the one or more advertising UEs 26 are candidates for connection establishment may comprise determining whether an advertising UE 26 is or is not a candidate for connection establishment based respectively on whether the UE is or is not: (i) in the direction in which the advertising UE intends to discover a UE to which to connect, as indicated by the intention code included in an advertisement message received from that advertising UE; and/or (ii) within the distance or radius from the advertising UE within which the advertising UE intends to discover a UE to which to connect, as indicated by the intention code included in an advertisement message received from that advertising UE.

In any of these embodiments, the connection 12 may be an application layer connection, a Proximity Services, Pro Se, connection, or a Vehicle-To-Everything, V2X, connection.

Also in any of these embodiments, radio layer parameters may include one or more of: Multiple Input Multiple Output, MIMO, parameters supported by the peer UE; a 3GPP standardization release version supported by the peer UE; one or more modulation and coding schemes, MCSs, supported by the peer UE; one or more transport block sizes, TBSs, supported by the peer UE; a processing latency capability supported by the peer UE; a quality of service level supported by the peer UE; a level of channel interference or congestion; one or more carrier frequencies supported by the peer UE; or one or more carrier aggregation, CA, band combinations supported by the peer UE.

Figure 9:
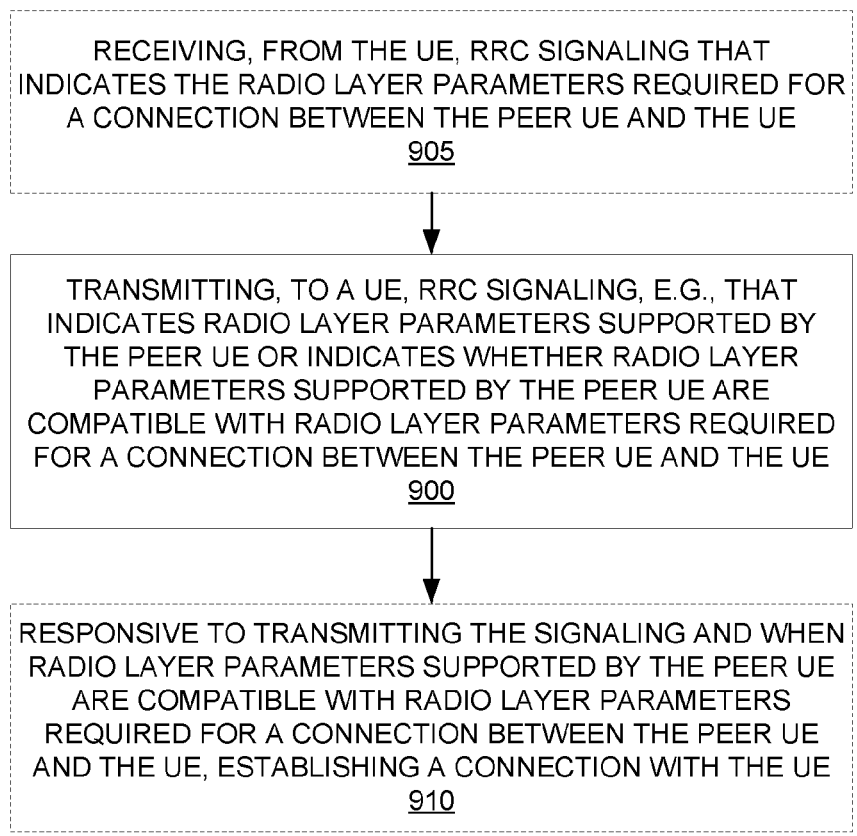
FIG. 9 is a logic flow diagram of a method performed by a peer UE according to some embodiments.

FIG. 9 depicts a corresponding method performed by a peer UE 14 according to some embodiments. The method comprises transmitting RRC signaling 16 to a UE 10 (Block 900). In some embodiments, the RRC signaling 16 indicates radio layer parameters 16A supported by the peer UE or indicates whether radio layer parameters supported by the peer UE 14 are compatible with radio layer parameters required for a connection between the peer UE and the UE 10. The method may further include, responsive to transmitting the signaling 16 and when radio layer parameters supported by the peer UE 14 are compatible with radio layer parameters required for a connection 12 between the peer UE 14 and the UE 10, establishing a connection 12 with the UE 10 (Block 910).

In some embodiments, the method further comprises receiving, from the UE 10, RRC signaling that requests the radio layer parameters supported by the peer UE. In this case, the RRC signaling transmitted to the UE indicates the requested radio layer parameters supported by the peer UE 14.

In other embodiments, the method further comprises receiving, from the UE 10, RRC signaling 18 that indicates the radio layer parameters required for a connection 12 between the peer UE 14 and the UE 10 (Block 905). In this case, the RRC signaling 16 transmitted to the UE 10 indicates whether radio layer parameters supported by the peer UE are compatible with radio layer parameters required for a connection between the peer UE and the UE.

In some embodiments, the method further comprises at an upper layer of the peer UE that is higher than an RRC layer of the peer UE, transmitting an advertisement message 28 to the UE 10. In some embodiments, an advertisement message 28 from an advertising UE indicates one or more of: a speed of the advertising UE; a location of the advertising UE; a type of the advertising UE; a proximity of the advertising UE to the UE; or a service of interest to the advertising UE. Alternatively or additionally, an advertisement message from an advertising UE includes an intension code 30. The intension code 30 may indicate one or more of: a direction, relative to the advertising UE, in which the advertising UE intends to discover a UE to which to connect; or a distance or radius from the advertising UE within which the advertising UE intends to discover a UE to which to connect.

In any of these embodiments, the connection 12 may be an application layer connection, a Proximity Services, Pro Se, connection, or a Vehicle-To-Everything, V2X, connection.

Also in any of these embodiments, radio layer parameters may include one or more of: Multiple Input Multiple Output, MIMO, parameters supported by the peer UE; a 3GPP standardization release version supported by the peer UE; one or more modulation and coding schemes, MCSs, supported by the peer UE; one or more transport block sizes, TBSs, supported by the peer UE; a processing latency capability supported by the peer UE; a quality of service level supported by the peer UE; a level of channel interference or congestion; one or more carrier frequencies supported by the peer UE; or one or more carrier aggregation, CA, band combinations supported by the peer UE.

The apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
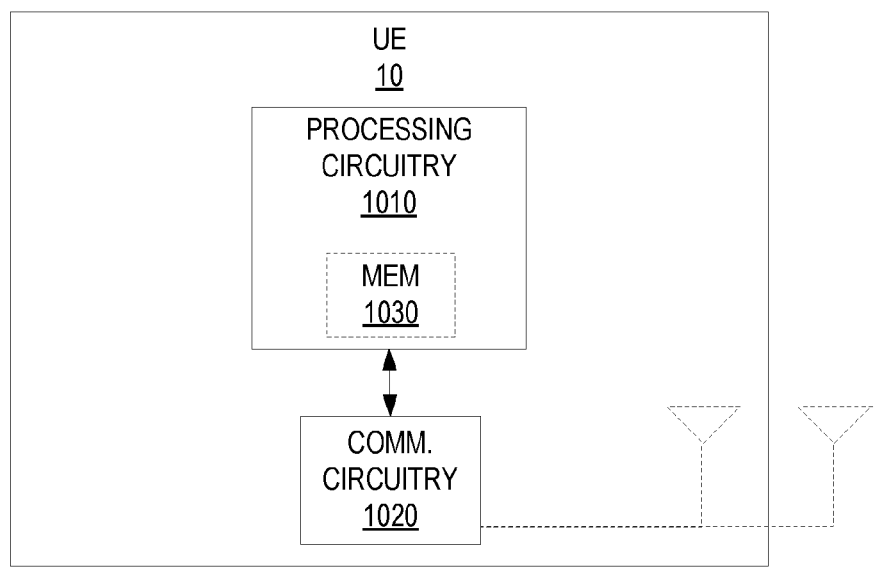
FIG. 10 is a block diagram of a UE according to some embodiments.

FIG. 10 for example illustrates a UE 10 as implemented in accordance with one or more embodiments. As shown, the UE 10 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, e.g., in FIG. 8, such as by executing instructions stored in memory 1030. The processing circuitry 1010 in this regard may implement certain functional means, units, or modules.

Figure 11:
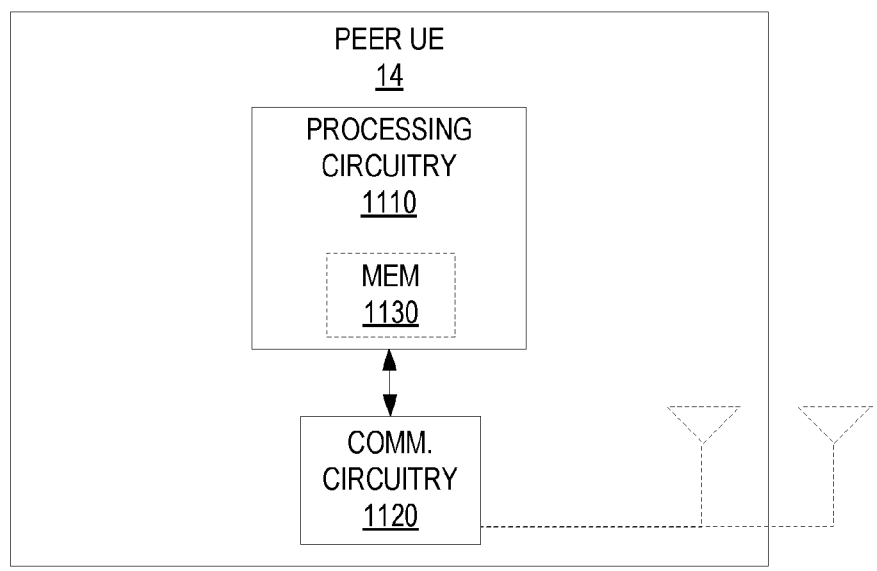
FIG. 11 is a block diagram of a peer UE according to some embodiments.

FIG. 11 illustrates a peer UE 14 as implemented in accordance with one or more embodiments. As shown, the peer UE 14 includes processing circuitry 1110 and communication circuitry 1120. The communication circuitry 1120 (e.g., radio circuitry) is configured to transmit and/or receive information to and/or from one or more other nodes, e.g., via any communication technology. Such communication may occur via one or more antennas that are either internal or external to the wireless device 1100. The processing circuitry 1110 is configured to perform processing described above, e.g., in FIG. 9, such as by executing instructions stored in memory 1130. The processing circuitry 1110 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 12:
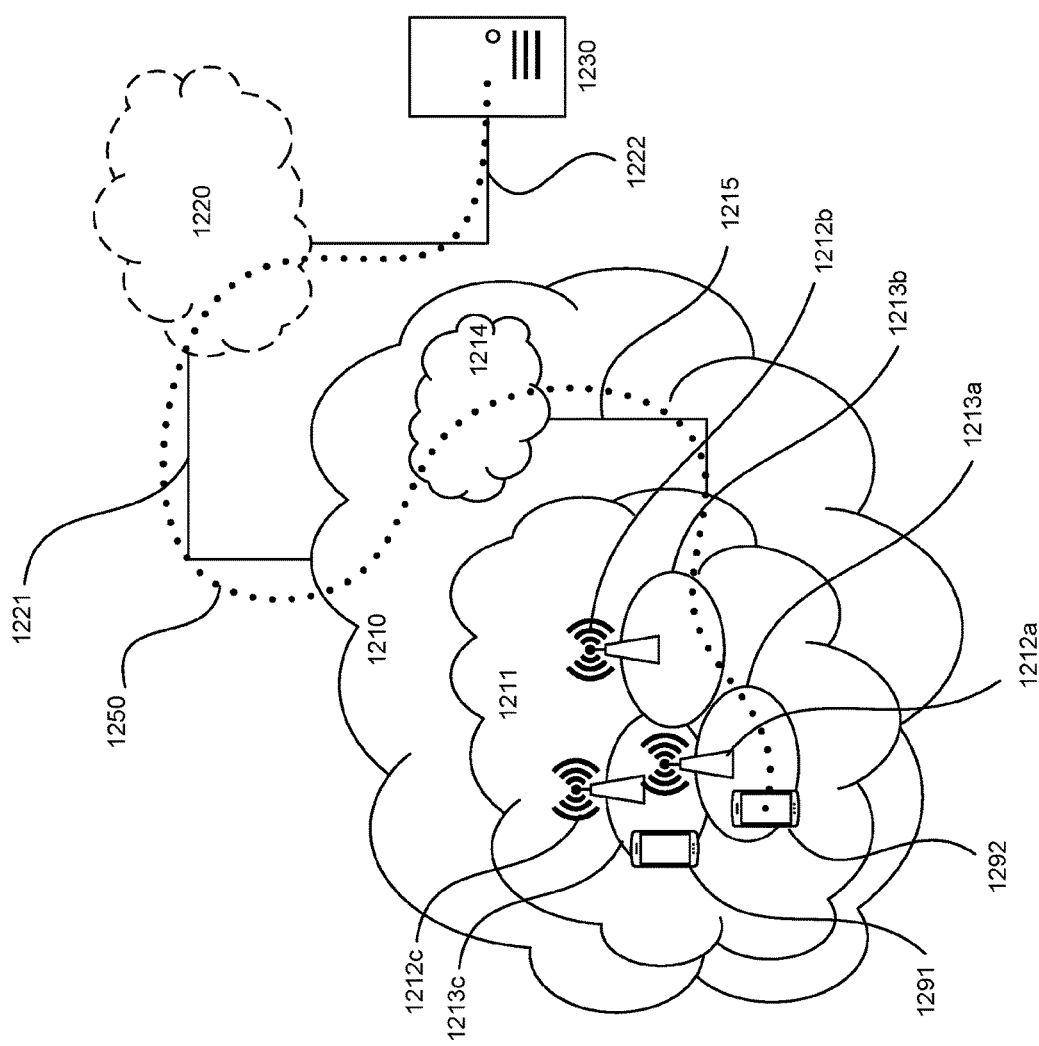
FIG. 12 schematically illustrates a telecommunication network connected via an intermediate network to a host computer.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
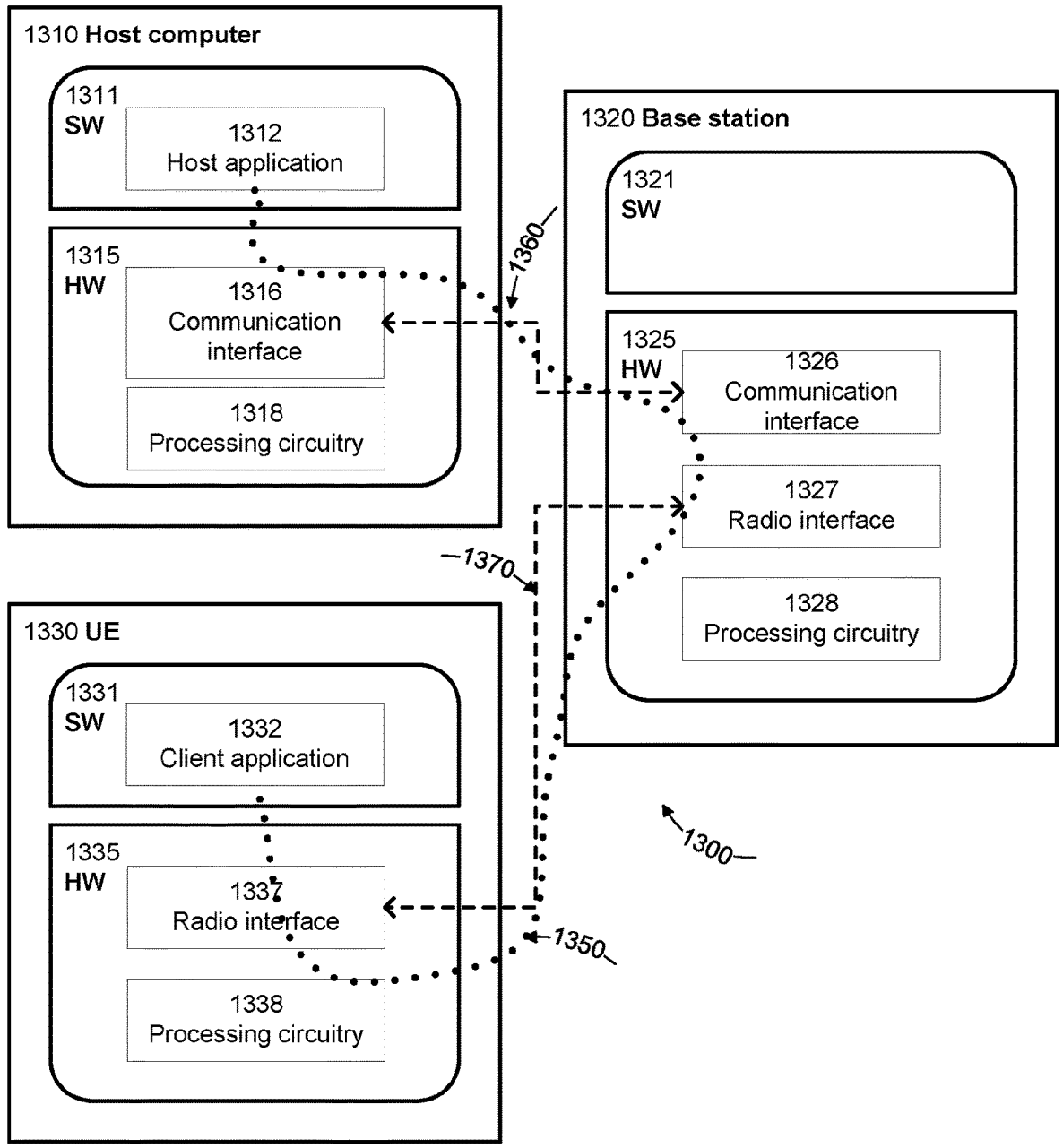
FIG. 13 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13)

served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
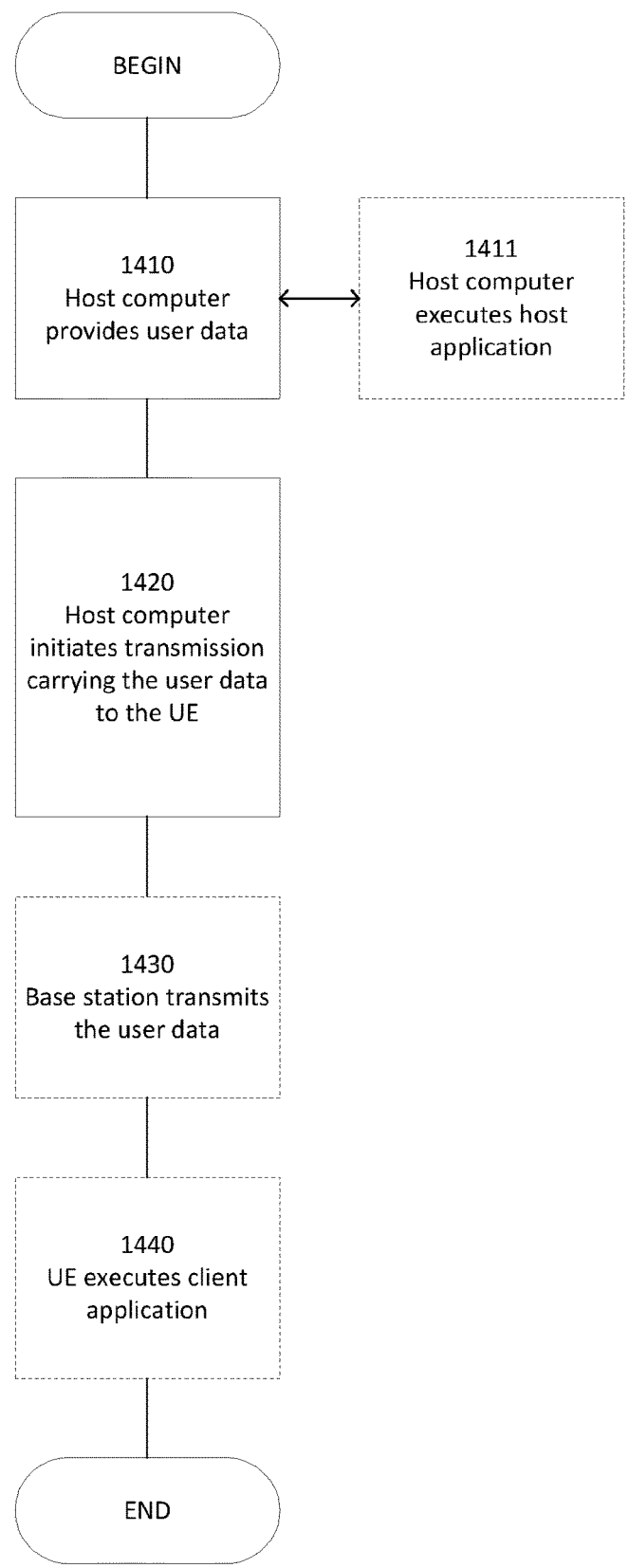
FIGS. 14 to 17 are flowcharts illustrating methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
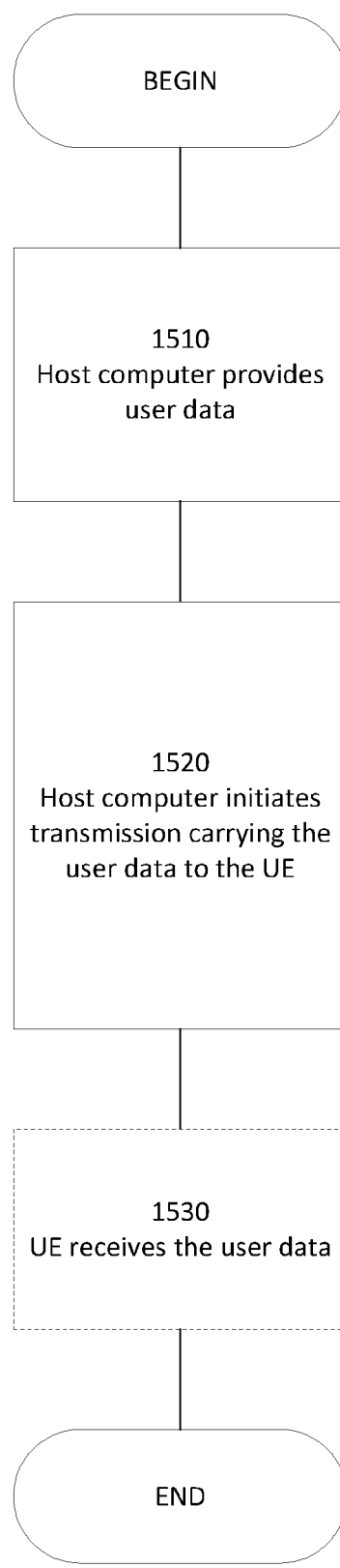

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
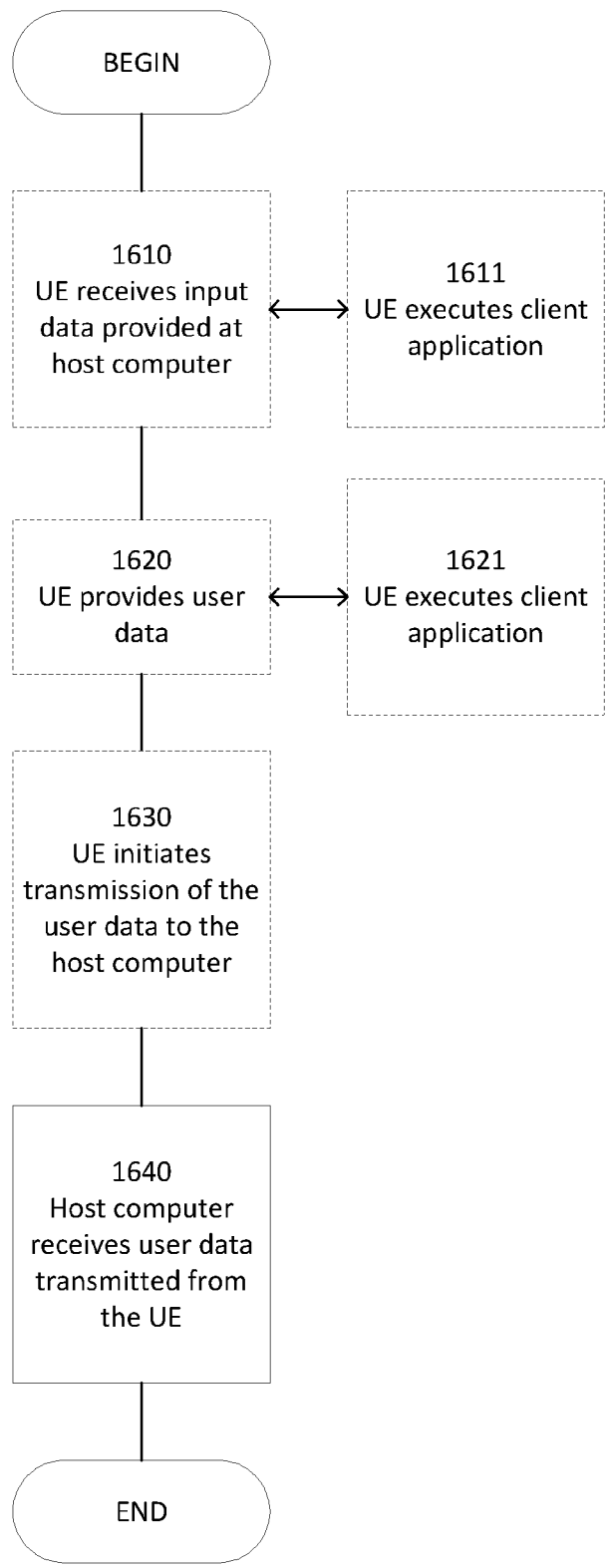

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
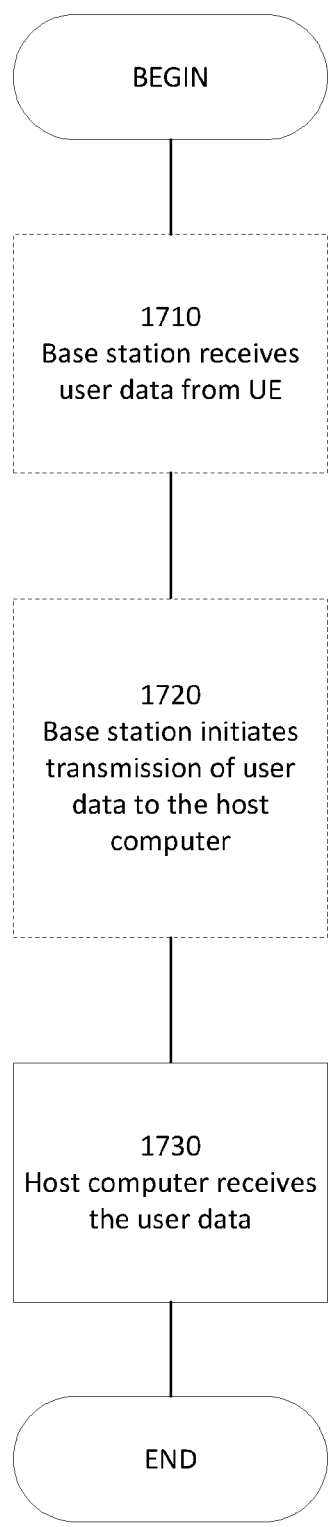

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

What is claimed is:

1. A method performed by a user equipment (UE), the method comprising:
receiving, from a peer UE, radio resource control (RRC) signaling that indicates radio layer parameters supported by the peer UE or indicates whether radio layer parameters supported by the peer UE are compatible with radio layer parameters required for a connection between the peer UE and the UE;
determining whether or not to establish a connection towards the peer UE based on the received RRC signaling;
receiving, at an upper layer of the UE that is higher than an RRC layer of the UE, one or more advertisement messages from one or more advertising UEs, the one or more advertising UEs including the peer UE;
determining, based on the one or more advertisement messages, which of the one or more advertising UEs are candidates for connection establishment; and
the peer UE being determined to be a candidate for connection establishment.

2. The method of claim 1, wherein the received RRC signaling indicates radio layer parameters supported by the peer UE, and wherein said determining comprises:
evaluating, based on the received RRC signaling, whether radio layer parameters supported by the peer UE are compatible with radio layer parameters required for a connection between the peer UE and the UE; and
determining whether or not to establish a connection towards the peer UE, based respectively on whether or not, according to said evaluating, radio layer parameters supported by the peer UE are compatible with radio layer parameters required for a connection between the peer UE and the UE.

3. The method of claim 1, wherein the RRC signaling indicates whether radio layer parameters supported by the peer UE are compatible with radio layer parameters required for a connection between the peer UE and the UE, and wherein said determining comprises determining whether or not to establish a connection towards the peer UE, based respectively on whether or not, according to the RRC signaling, radio layer parameters supported by the peer UE are compatible with radio layer parameters required for a connection between the peer UE and the UE.

4. The method of claim 3, further comprising, before receiving the RRC signaling, transmitting to the peer UE RRC signaling that indicates radio layer parameters required for the connection.

5. The method of claim 1, further comprising establishing or not establishing the connection towards the peer UE depending on said determining.

6. The method of claim 1, further comprising:
receiving, at the RRC layer of the UE, information from an upper layer of the UE that indicates one or more peer UEs as candidates for connection establishment, wherein the upper layer is higher than the RRC layer, wherein the one or more peer UEs includes said peer UE;
responsive to receiving the information at the RRC layer, triggering an RRC layer information exchange with each of the one or more peer UEs in which the UE receives from each peer UE RRC signaling that indicates radio layer parameters supported by the peer UE or indicates whether radio layer parameters supported by the peer UE are compatible with radio layer parameters required for a connection between the peer UE and the UE;
determining, at the RRC layer of the UE and based on the RRC layer information exchange with each of the one or more peer UEs, whether radio layer parameters supported by the peer UE are compatible with radio layer parameters required for a connection between the peer UE and the UE; and
transmitting, from the RRC layer to the upper layer, information indicating at least one of the one or more peer UEs that supports radio layer parameters which are compatible with radio layer parameters required for a connection between the peer UE and the UE, and
wherein said determining is performed by the upper layer based on the information transmitted from the RRC layer to the upper layer.

7. The method of claim 1, wherein an advertisement message from an advertising UE indicates one or more of:
a speed of the advertising UE;
a location of the advertising UE;
a type of the advertising UE;
a proximity of the advertising UE to the UE; or
a service of interest to the advertising UE.

8. The method of claim 1, wherein an advertisement message from an advertising UE includes an intention code, wherein the intention code indicates one or more of:
a direction, relative to the advertising UE, in which the advertising UE intends to discover a UE to which to connect; or
a distance or radius from the advertising UE within which the advertising UE intends to discover a UE to which to connect.

9. The method of claim 8, wherein determining which of the one or more advertising UEs are candidates for connection establishment comprises determining whether an advertising UE is or is not a candidate for connection establishment based respectively on whether the UE is or is not:

in the direction in which the advertising UE intends to discover a UE to which to connect, as indicated by the intention code included in an advertisement message received from that advertising UE; and/or within the distance or radius from the advertising UE within which the advertising UE intends to discover a UE to which to connect, as indicated by the intention code included in an advertisement message received from that advertising UE.

10. The method of claim 1, wherein the connection is an application layer connection, a Proximity Services (Pro Se) connection, or a Vehicle-To-Everything (V2X) connection.

11. The method of claim 1, wherein radio layer parameters include one or more of:
Multiple Input Multiple Output (MIMO) parameters supported by the peer UE;
a 3GPP standardization release version supported by the peer UE;
one or more modulation and coding schemes (MCSs) supported by the peer UE;
one or more transport block sizes (TBSs) supported by the peer UE;
a processing latency capability supported by the peer UE;
a quality of service level supported by the peer UE;
a level of channel interference or congestion;
one or more carrier frequencies supported by the peer UE; or
one or more carrier aggregation (CA) band combinations supported by the peer UE.

12. A user equipment (UE), the UE comprising:
processing circuitry configured to:
receive, from a peer UE, radio resource control (RRC) signaling that indicates radio layer parameters supported by the peer UE or indicates whether radio layer parameters supported by the peer UE are compatible with radio layer parameters required for a connection between the peer UE and the UE;
determine whether or not to establish a connection towards the peer UE based on the received RRC signaling;
receive, at an RRC layer of the UE, information from an upper layer of the UE that indicates one or more peer UEs as candidates for connection establishment, wherein the upper layer is higher than the RRC layer, wherein the one or more peer UEs includes said peer UE;
responsive to receiving the information at the RRC layer, trigger an RRC layer information exchange with each of the one or more peer UEs in which the UE receives from each peer UE RRC signaling that indicates radio layer parameters supported by the peer UE or indicates whether radio layer parameters supported by the peer UE are compatible with radio layer parameters required for a connection between the peer UE and the UE;
determine, at the RRC layer of the UE and based on the RRC layer information exchange with each of the one or more peer UEs, whether radio layer parameters supported by the peer UE are compatible with radio layer parameters required for a connection between the peer UE and the UE;
transmit, from the RRC layer to the upper layer, information indicating at least one of the one or more peer UEs that supports radio layer parameters which are compatible with radio layer parameters required for a connection between the peer UE and the UE; and
the determining being performed by the upper layer based on the information transmitted from the RRC layer to the upper layer.

\* \* \* \* \*